Patented July 30, 1935

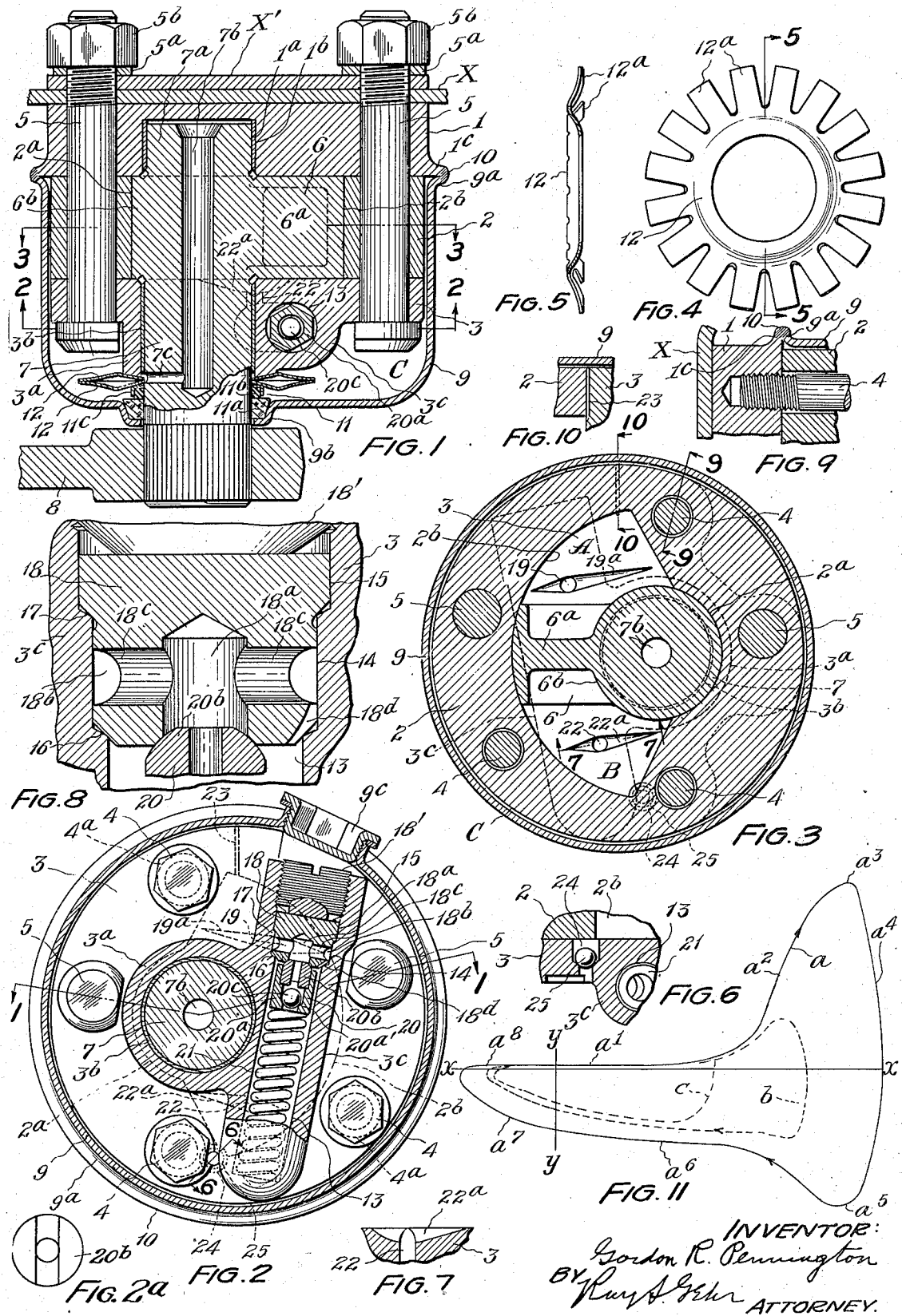

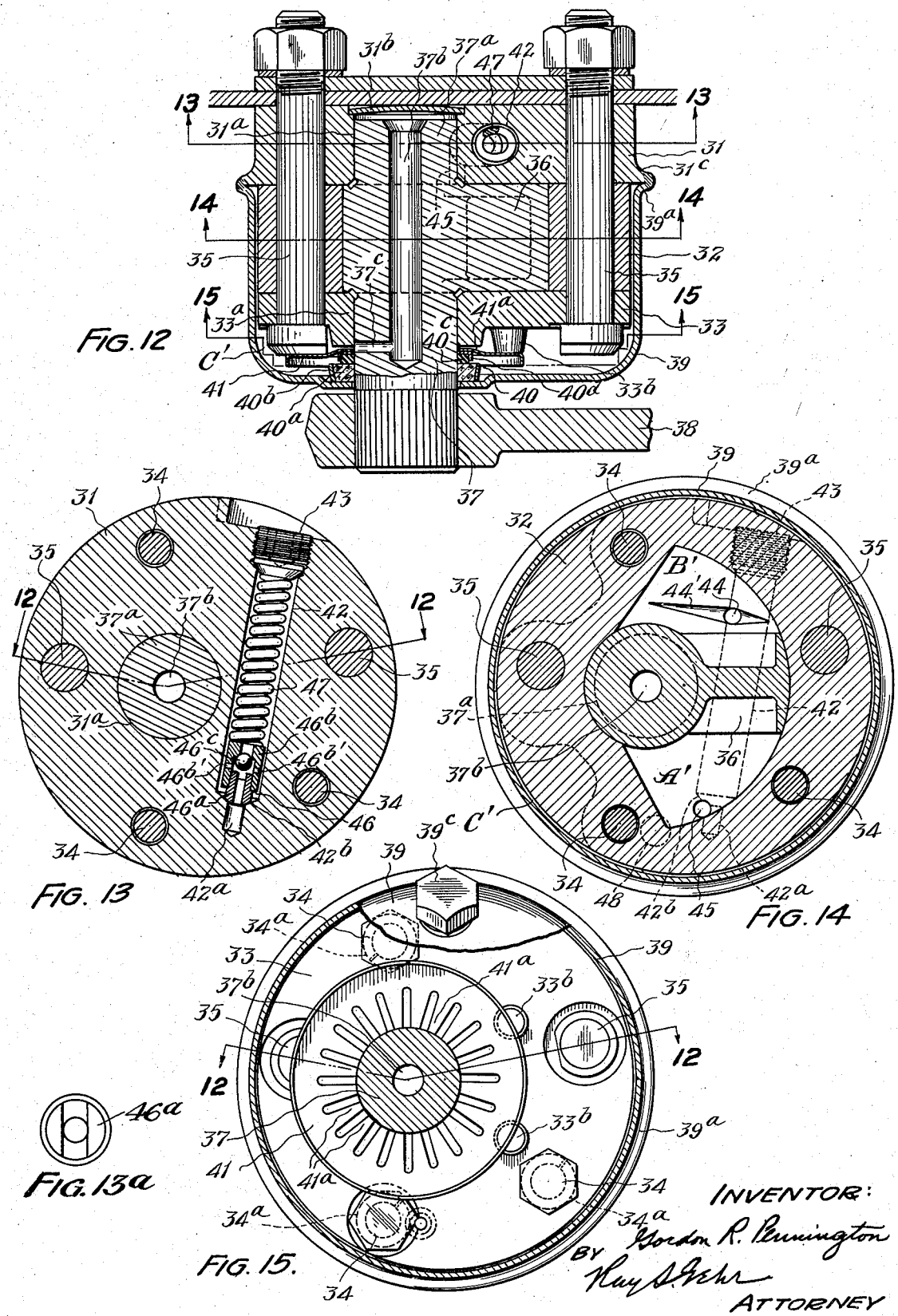

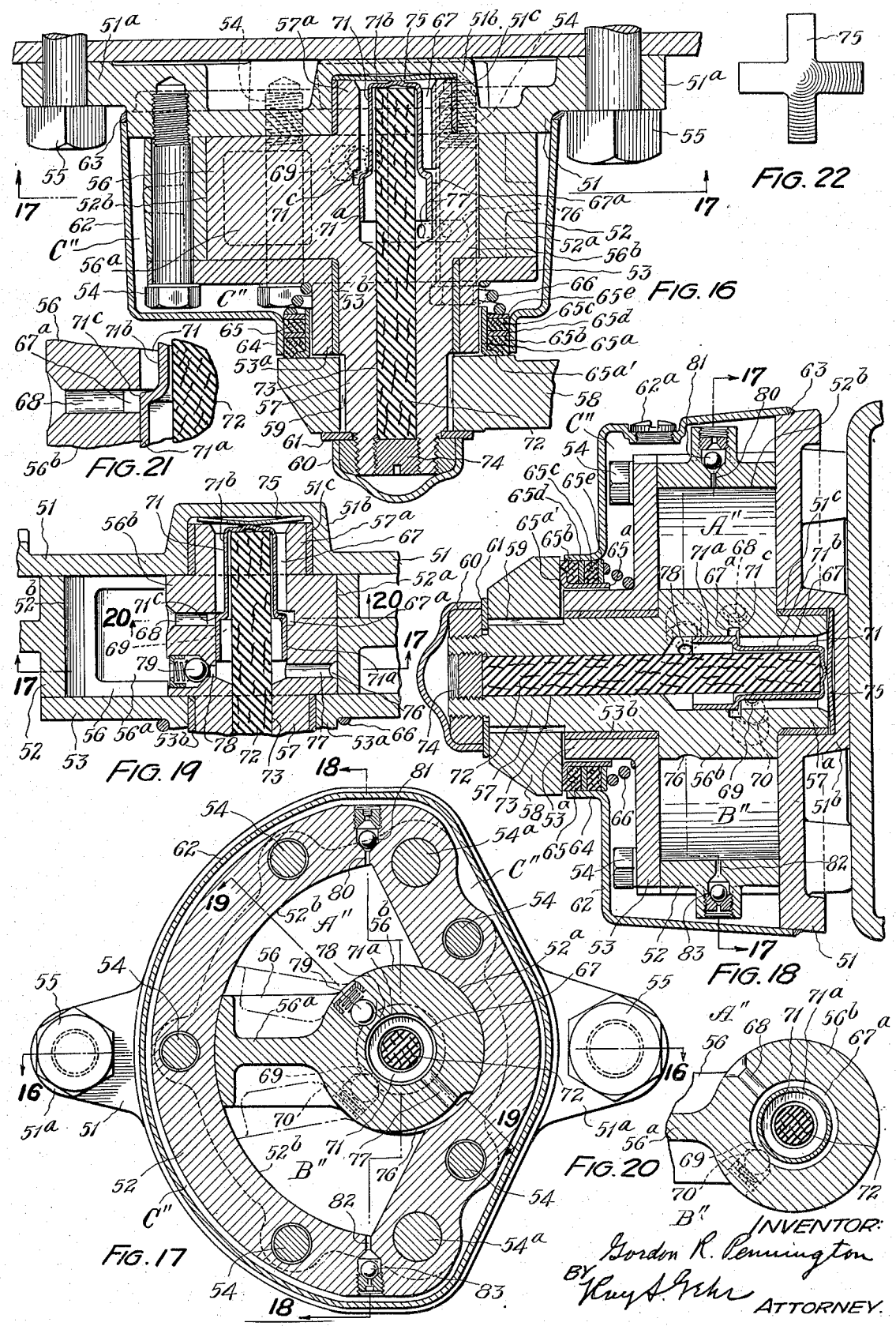

2,009,677

UNITED STATES PATENT OFFICE 2,009,677

SHOCK ABSORBER FOR MOTOR VEHICLES

Gordon R. Pennington, Cleveland Heights, Ohio, assignor to Pennington Engineering Company, Cleveland, Ohio, a corporation of Ohio Application November 20, 1930, Serial No. 496,909

37 Claims. (Cl. 188—89)

The invention relates to shock absorbers of the hydraulic type and the improvements have to do especially, though not exclusively, with double-acting hydraulic shock absorbers which are designed to control and preferably to supplement the action of the suspension springs of the vehicle. In some of its more important aspects the invention relates to improvements that are especially applicable to shock absorbers of the character patented in my United States Patent Reissue No. 17,049.

The present application in part constitutes a continuation in part of my copending application Serial No. 320,413 filed November 19, 1928.

The chief objects of the present invention are comprised in the provision of a hydraulic shock absorber characterized by (a) novel operating characteristics adapted to secure improved riding qualities, (b) automatic compensation for the effect of temperature changes upon the working fluid, and (c) features of construction which favor low cost of production and a minimum amount of care in the upkeep of the instrument and which give the instrument a compact and pleasing form.

The foregoing objects and others more or less incidental or ancillary thereto, as well as the preferred manner of attaining the various objects, will be explained fully in the following detailed description referring to the accompanying drawings.

In the drawings, Fig. 1 is an approximately horizontal sectional view of a preferred form of my improved shock absorber, the section being taken on the line 1—1 of Fig. 2.

Fig. 2 is a vertical section taken on the line 2—2 of Fig. 1.

Fig. 2ª is an enlarged bottom end view of the valve element 20ᵇ shown in Fig. 2.

Fig. 3 is a vertical section taken on the line 3—3 of Fig. 1.

Figs. 4 and 5 are face and sectional views, respectively, of one of the spring disks for the shaft packing.

Fig. 6 is an enlarged fragmentary section on the line 6—6 of Fig. 2.

Fig. 7 is an enlarged fragmentary section on the line 7—7 of Fig. 3.

Fig. 8 is an enlarged sectional view of the portion of the valve device shown in Fig. 2.

Fig. 9 is a fragmentary section taken on the line 9—9, Fig. 3.

Fig. 10 is a fragmentary section taken on the line 10—10, Fig. 3.

Fig. 11 is a diagram representing the cycle of resisting forces set up by the shock absorber to relative movement of the casing and piston parts corresponding to the movement of the frame and axle parts of the vehicle on which the shock absorber is used.

Fig. 12 is an approximately horizontal sectional view of a modified form of instrument embodying my improvements, the section being taken on the line 12—12 of Figs. 13 and 15.

Fig. 13 is a vertical section taken on the line 13—13, Fig. 12.

Fig. 13ª is an enlarged top end view of the valve element 46ª shown in Fig. 13.

Fig. 14 is a vertical section taken on the line 14—14, Fig. 12.

Fig. 15 is a vertical section taken on the broken line 15—15, Fig. 12.

Fig. 16 is a horizontal section showing another modified form of instrument, the section being taken on the line 16—16, Fig. 17.

Fig. 17 is a vertical section on the line 17—17, Figs. 16, 18 and 19.

Fig. 18 is a vertical section on the broken line 18—18, Fig. 17.

Fig. 19 is a fragmentary section on the line 19—19, Fig. 17.

Fig. 20 is a fragmentary section on the line 20—20, Fig. 19.

Fig. 21 is an enlarged fragmentary portion of Fig. 19 to more clearly illustrate a feature of the construction.

Fig. 22 is a detached view of a spring element of the instrument.

The instruments illustrated in the drawings are in each instance intended to be mounted upon a motor vehicle in any of the known ways to control the movements of the chassis frame and vehicle body in relation to the ground wheels of the vehicle. Sometimes the casing of the instrument is mounted on the chassis frame and the piston element is connected by suitable crank and link devices to the axle of the vehicle, while on the other hand the casing is sometimes mounted on the axle and the piston connected to the chassis frame. The former arrangement is the commoner and for the sake of simplicity it will be assumed throughout the following description that the instruments described are so mounted.

Referring in detail to the constructions illustrated, and first to the form of instrument shown in Figs. 1 to 10, the casing structure of the instrument comprises a rear plate-like part 1 which is circular in form, an intermediate part 2, and a front plate-like part 3. These casing parts may be made of any suitable metal. I prefer to make them in the form of steel forgings, but they may also be made in the form of malleable iron castings. Still other metals may be found satisfactory. The parallel side surfaces of the intermediate casing part 2 nicely fit the adjacent plane surfaces of the rear and front parts and the three parts are tightly and rigidly secured together by cap screws 4, 4 and dowel bolts 5, 5. The cap screws pass loosely through apertures in the front part 3 and the intermediate part 2 and engage threaded closed-bottom holes in the rear part 1 (Fig. 9). The dowel bolts 5 engage apertures in the front casing part 3 and the intermediate casing part 2 with suitable fits for dowel members and engage apertures in the rear casing part 1 with relatively heavy forced fits, the object of the very close fits in the rear part 1 being to obviate leakage, as will later be more fully explained. Preferably the dowel bolts, or at least the portions thereof engaging the rear casing part 1, are plated or otherwise coated with some relatively soft metal, such as cadmium. The coating metal on the bolts, when the latter are forced through the apertures in the casing part 1, serves to fill the minutest interstices of the joint. The dowel bolts 5 project from the rear face of the shock absorber casing and thus serve as means for securing the casing to the frame of the vehicle as well as helping to secure the three parts of the casing together and serving, as dowels, to accurately position the three casing parts in relation to each other. In Fig. 1, X represents a portion of the web of the side frame of the vehicle and $X^1$ a backing or strengthening plate, both of which members are formed with holes to receive the bolts 5. Suitable lock washers $5^a$ are interposed between the backing plate $X^1$ and the nuts $5^b$ of the securing bolts. Similarly, lock washers $4^a$ are interposed between the heads of the cap screws 4 and the front casing member 3 to insure that the cap screws do not loosen. The casing structure includes additional parts which will presently be described.

As is shown by Fig. 3, the casing part 2 forms the peripheral wall of an approximately sector shape chamber. In this chamber is fitted a swinging piston or vane 6. The piston is connected rigidly and preferably integrally to a shaft 7 which extends through the front casing member 3 and is rotatably supported in a bearing boss $3^a$ thereof, said boss being supplied with a suitable anti-friction bushing $3^b$. The rearwardly extending shaft section $7^a$ is rotatably supported in a bearing $1^a$ which is formed by boring out the rear casing plate 1 and fitting the same with a suitable bearing bushing $1^b$. The shaft is formed with an axial bore $7^b$ which extends from the rear end of the shaft to a point somewhat beyond the outer end of the bearing boss $3^a$ where it joins a hole $7^c$ extending radially to the surface of the shaft. The purpose of the passages $7^b$ and $7^c$ will later be explained. The piston 6 comprises a vane part $6^a$ having a web and flange construction, which is shown in full lines in Fig. 3 and by dotted lines in Fig. 1, and a hub part $6^b$ which carries the vane and which is substantially greater in diameter than the shaft 7. The peripheral wall of the sector shape chamber of the casing is formed with a hollow cylindrical extension at $2^a$ to accommodate the hub part $6^b$ of the piston (Fig. 3). The chamber wall at $2^a$ and the peripheral wall thereof at $2^b$, the inner plane surfaces of the casing parts 1 and 3 and the various surfaces of the piston which are adjacent to and cooperate with these casing surfaces are all carefully machined or finished, as hereinafter explained, to afford working fits between the piston and the walls of the casing chamber that will prevent undue leakage of the working fluid from one side of the piston to the other.

A crank arm of any suitable construction, such as 8, is mounted on the outer end of the shaft 7, the shaft end and the aperture of the crank arm being toothed or serrated and the arm placed upon the shaft with a tight fit. The outer part of the crank arm 8 is broken away but it will be understood that it may be of any suitable construction to cooperate with a suitable link which in turn is connected with the axle of the vehicle. Such links are commonly connected to the crank arm and to the axle fittings by ball and socket or other types of universal joint and such fittings are contemplated in the use of my improved shock absorber.

To provide a reserve reservoir for working fluid and at the same time afford a liquid tight closure for the entire apparatus, the casing structure also includes an outer cupped part 9 which can appropriately be stamped or pressed from sheet steel. The rear open side of this cupped casing part is formed with a narrow outwardly turned flange $9^a$ which engages an outwardly turned flange $1^c$ of the casing part 1 and is rigidly secured to the latter part with a liquid tight joint. Such a joint can be formed in various ways, but I prefer to make the connection by forming a welded or brazed joint 10 by the use of methods and apparatus known in the art. I shall hereafter employ the term "welded" as comprehensive of welding, brazing, and the like.

To render the joint between the shaft 7 and the casing part 9 liquid tight, I provide a packing designated in its entirety by the numeral 11. This packing comprises an annular ring $11^a$, preferably of cork, which fits within a forwardly and inwardly extending annular flange $9^b$ formed on the casing part 9. It also comprises a ring $11^b$, preferably of rubber, which surrounds the shaft and engages the inner side of the cork ring $11^a$ the rubber ring preferably being fitted with a metal ring or washer $11^c$ which engages the inside and the outer periphery of said ring to limit the outward deformation thereof. Between the inside packing ring $11^b$ and the adjacent end of the bearing boss $3^a$ is arranged a pair of spring disks 12, 12. One of these disks is shown detached in Figs. 4 and 5. The outer periphery of the disk or annulus is notched to form a series of fingers $12^a$, $12^a$ and each disk is given a form, as shown in Fig. 5, such that when a pair of the disks are assembled face to face on the shaft 7 and compressed between the packing rings and the bearing boss 7 the spring action of the disks serves to maintain a yielding axially outward pressure on the packing rings. A spring of this character is highly effective and at the same time is extremely compact axially of the shaft. The axial pressure exerted by it on the packing rings $11^a$ and $11^b$ serves to press them into close engagement with the shaft and with each other and also to press the packing ring $11^a$ into close engagement with the casing part 9 and I have found a packing of this character highly effective to prevent leakage of liquid.

The piston 6 divides the sector-shape cavity of the casing into a pressure chamber A above the piston and a pressure chamber B below the piston (Fig. 3); and, as is clearly shown in Fig. 1, a relatively large irregular chamber C is provided between the cupped outer casing member 9 and the inner casing structure made up of the parts 1, 2 and 3. In the operation of the device, the chambers A and B and the chamber or reservoir C are occupied by a body of liquid which constitutes the working fluid of the device, glycerin or oil of suitable consistency being preferably employed. The casing member 9 is provided at its upper side with a filling aperture and a suitable screw closure therefor 9ᶜ to provide for the introduction of the liquid. In the operation of the device, the pressure in the chamber A resists the upward movement of the piston 6, thus checking the rebound of the vehicle springs, while pressure in the chamber B serves to resist the downward movement of the piston to check and control the compression of the vehicle springs. The features of construction by which these functions are suitably accomplished will now be explained.

The front plate 3 of the casing structure is formed with an elongated thickened portion or extension 3ᶜ which extends across the face of the plate approximately from the top to the bottom thereof and merges at one side with the bearing boss 3ᵃ (Figs. 1 and 2). The extension 3ᶜ is formed with an axial bore, the open upper end of which is disposed adjacent the filling aperture of the casing member 9. The bore of the extension 3ᵃ is formed with three different diameters, the lower and longer part of the bore 13 being the smallest, the intermediate portion 14 being the next largest and the upper portion 15 being the largest. The shoulders 16 and 17 formed at the junctions of the three parts of the bore afford annular seats for opposing shoulders formed upon a valve seat member 18 which is forced against the shoulders 16 and 17 by a screw plug 18' which fits the threaded upper end of the bore 15. The valve seat member 18 has an axial bore 18ᵃ, a peripheral groove 18ᵇ and a plurality of radial passages 18ᶜ which place the axial bore 18ᵃ in communication with the radial groove 18ᵇ. A passage 19 drilled from the inner face of the plate 3 into the bore 14 affords communication between the pressure chamber A and the annular groove 18ᵇ. The engagement of the shoulders of the seat member 18 with the shoulders 16 and 17 forms liquid tight joints except at one point of the shoulder 16 where a small groove 18ᵈ in the member 18 constitutes a passage of small capacity from the annular groove 18ᵇ to the bore 13.

The annular edge of the member 18 at the lower end of the bore 18ᵃ serves as a seat for a valve 20 which comprises a tubular body part 20ᵃ, a valve part proper 20ᵇ which is secured in the upper end of the part 20ᵃ with a forced fit and a ball check valve 20ᶜ which seats upon the shoulder 20ᵃ' at the lower end of the body member 20ᵃ. The valve part 20ᵇ is formed with an axial bore and with a transverse slot across its lower end (see Fig. 2a) so that the ball valve 20ᶜ is effective to close the passage through the valve 20 against flow downward but cannot close the passage against flow upward. The valve 20 is pressed upward against the seat member 18 by a relatively strong coiled spring 21 interposed between the valve and the lower end of the bore 13. The mutually contacting surfaces of the valve member 20ᵇ and the seat member 18 have a spherical form so that a liquid tight closure at this point is assured without the necessity of a nice axial alignment of the parts. The lower part of the bore 13 communicates with the lower pressure chamber B of the casing through a passage 22 drilled from the inner face of the plate 3 into the said bore. The relation of the passages 19 and 22 to the sector-shape working chamber of the casing and to the piston 6 therein is indicated by Fig. 3. It will be noted that as the piston swings downward its lower edge will pass over the inner end of the passage 22 and as it swings upward its upper edge passes over the inner end of the passage 19. In order that the flow through the two passages may be controlled by the movement of the piston 6 in a certain desired manner, which will hereafter be referred to, the inner face of the plate 3 is formed at the inner end of the passage 22 with a tapered groove 22ᵃ, and at the inner end of the passage 19 with a tapered groove 19ᵃ.

Each of the pressure chambers A and B has a certain direct communication with the reservoir chamber C. That is, the chamber A communicates at its upper end through a very small passage 23 with the chamber C. This passage can be formed with a scratching tool on the face of any one of the mutually abutting faces of the casing members 1, 2 and 3. The size of the passage 23 is such as to permit free egress of any air that may enter the chamber A while it prevents outflow of any substantial amount of the working liquid. The chamber B communicates at its lowermost point with the reservoir C through a passage 24 formed in the front plate 3 of the casing. The inner end of the passage 24 has a larger bore than the outer end thereof, thus affording an annular shoulder intermediate its ends that serves as a seat for a ball check valve 25. The passage 24 in the casing plate 3 is so located in relation to the inner peripheral wall formed in the casing member 2 that said casing member incompletely covers the inner end of the passage 24 so as to permit flow of liquid through it while the escape of the ball 25 from the passage is prevented. A valved passage is thus afforded by an exceedingly simple and cheap form of construction.

The shock absorber is made ready for use by filling its working chambers with a suitable liquid, preferably an oil such as is now commonly used in such instruments, though a suitable glycerin, such as a 95% solution of glycerin in alcohol, may be used. The filling may be accomplished by removing the screw closure 9ᶜ of the casing and pouring the liquid into the reservoir chamber C, meanwhile moving the crank arm 8 to swing the piston from its lowermost position to its highest position and if necessary repeating this movement several times until it is certain that sufficient liquid is drawn from the reservoir C through the passage 24 into the lower chamber B and thence forced into the upper chamber A so that both chambers B and A are completely filled with liquid. The reservoir C can then be filled with liquid up to the level of the filling aperture, thus providing a large reserve supply of working liquid. It will be understood that when the piston 6 is swung from its lower to its upper position the chamber B is filled with liquid while air in the chamber A is forced out through the passage 23 into the reservoir chamber C and thence outward through the filling aperture, while on the downward movement of the piston 6 the liquid in the chamber B is transferred through the passages in the front plate 3 of the casing to the chamber A. By repeating the movement of the piston it is insured that the chambers A and B are completely filled with liquid.

Considering now the operation of the shock absorber which has been described in detail, it is to be observed at the outset that while some at least of the improvements embodied therein are applicable to widely varying forms of construction and types of operation, the particular embodiment which has been described is designed for operation upon a cycle including the main features of the cycle disclosed in my United States patent Reissue No. 17,409 previously referred to. That is to say, the apparatus is designed to cooperate with vehicle springs that are softer or more flexible than springs heretofore employed with other types of shock absorbers, the construction and operation of the apparatus being such that it offers a resistance to the first part of the full compression of the vehicle springs which is so slight as to be practically negligible, i. e., unnoticeable to a rider in the vehicle, while after such initial compression of the springs occurs the resistance to further compression afforded by the shock absorbers is automatically increased relatively rapidly as such compression occurs so that a large resistance is developed to supplement the resistance of the vehicle springs, the maximum resistance being reached at or near the end of the spring-compressing movement of the parts. On the other hand, the resistance afforded by the apparatus to the rebound of the compressed vehicle springs is preferably never equal to the maximum resistance opposed to the compression of the springs but in any case has a value at or near the normal position of the parts on their movement in the rebound direction which is substantially greater than the resistance offered to the first part of the spring-compressing movement. The cycle of the present instrument has the added feature that the rebound resistance, as well as that during spring compression, is automatically varied.

In the use of my shock absorbers, the vehicle is preferably fitted in the usual manner with a set of four of the devices, one to control the action of each of the four springs.

In the drawings the piston 6 of the shock absorber is shown in its normal or intermediate position corresponding to the normal load of the vehicle with the latter standing still or moving over a smooth and even surface, and the corresponding position of the crank arm 8, which may be assumed to be connected through a link (not shown) with the axle of the vehicle, is also approximately horizontal. The normal positions of the piston and connected parts obviously will vary somewhat with variation of the vehicle load.

In the operation of the device, when the vehicle strikes an obstruction its axle is lifted, the vehicle spring is correspondingly compressed and at the same time the crank arm 8 of the shock absorber is swung upward while the piston 6 is swung downward from its normal position shown in the drawings. At the beginning of the downward movement of the piston 6 the liquid in the chamber B offers very little resistance to the movement of the piston because the liquid has practically unobstructed egress from the chamber through the passage 22, bore 13, past the check valve 20c, thence through the various passages of the seat member 18, and the passage 19 to the upper chamber A of the instrument. In addition to the upward flow of the liquid through the valve 20 there is also a small passage open through the by-pass groove 18d. However, after the downward movement of the piston 6 has continued for a certain distance corresponding to a certain compression of the vehicle spring, the lower edge of the piston 6 begins to cut off the passage 22 and its tapered groove 22a and as the movement of the piston continues there is caused a gradually increasing throttling of the liquid flowing from the pressure chamber B so that energy is absorbed in this way at an increasing rate as the piston continues its movement and correspondingly increased resistance to the compression of the spring is afforded by the shock absorber. The resistance developed by the shock absorber to the spring compression automatically increases as the corresponding movement of the piston increases and that movement increases with the intensity of the force causing it. I prefer to design the parts and the clearances of the shock absorber so that it will offer sufficient resistance to the compression of the vehicle spring to enable it and said spring to fully absorb all shocks that will ordinarily be encountered by the driver of average care and rely upon the rubber bumper with which vehicle axles are commonly equipped to supplement the shock absorber spring in the case of the rarely encountered extremely heavy shock. However, it is to be understood that the shock absorber can be designed to completely supplement the vehicle spring without the use of the rubber bumper.

When the upward movement of the vehicle axle in relation to the vehicle is arrested, the vehicle spring starts to return to its normal loaded form and this so-called "rebound" of the spring starts to swing the crank arm 8 downward and the piston 6 upward. The resistance to this upward movement of the piston is determined by two factors, namely, (a) the force with which the spring 21 holds the valve 20 on its seat and (b) the position of the piston in relation to the groove 22a at the beginning of the rebound. Neglecting for the moment the second of these factors, it will be seen that the upward movement of the piston places the liquid in the chamber A, the passage 19, the various passages in the valve seat member 18, the axial passage of the valve 20 and the passage 22 under pressure with the result that a small amount of the liquid is forced through the small groove 18d and, in case the vehicle spring has been considerably compressed and the rebound force is correspondingly large, the spring pressed valve 20 is forced downward off its seat to permit additional flow of liquid from the chamber A past the valve 20 and through the bore 13 and the passage 22 into the lower pressure chamber B. The resulting resistance to the movement of the piston obviously is dependent upon the tension of the spring 21. It is contemplated that this spring when assembled in the apparatus shall be sufficiently preloaded to afford a suitable resistance to the opening of the valve. This resistance can be varied either by selecting springs of different sizes or strength or by varying the degree to which the spring is preloaded by introducing one or more thin washers (not shown) either between the lower end of the spring and the bottom of the bore 13 or between the upper end of the spring and the valve member 20a. In either event the tension of the spring is made such as to afford a sufficient resistance to the outflow of liquid from the chamber A as shall, in conjunction with the second resistance factor, adequately check the rebound of the vehicle springs. As to the second factor above referred to, the resistance to the upward movement of the piston determined by the spring 21 will be modified if the piston had moved far enough during the compression of the vehicle springs to more or less cover the throttling groove 22ª. Thus, for example, if the piston had moved down far enough to practically completely cover the groove 22ª it is obvious that the resultant throttling of the flow through the groove 22ª would in itself strongly resist the upward movement of the piston and this resistance is added to the resistance offered by the valve spring, with the result that the return or rebound movement of the piston is slow at the beginning of the movement but is permitted to pick up speed as the groove 22ª is uncovered. It will be understood, of course, that when the compression of the vehicle springs has not been great enough so that the downward movement of the piston covered the groove 22ª to any considerable extent, the resistance to rebound afforded by the shock absorber is determined practically entirely by the tension of the valve spring 21. It will be seen that the side of the piston and the tapered groove 22ª constitute, in effect, a valve adapted gradually to shut off the passage 22 as the piston moves. Thus the resistance of the shock absorber to spring rebound movement, as well as to spring compression, varies with the intensity of the force causing the movement. The small groove 18ᵈ in the valve seat member 18 is provided to afford a small by-pass around the valve 20 and thus permit a small amount of liquid to flow from the upper chamber A without lifting the valve 20 off its seat. This permits the piston 6 to have very short or very slow movements without any substantial hydraulic resistance and thus allows the vehicle springs to have relative freedom of action in response to the very small irregularities of the road surface. The capacity of the groove 18ᵈ is not made great enough to noticeably diminish the hydraulic resistance of the shock absorber to expansion movements of the vehicle springs which are of substantial scope or of great speed.

When relatively soft and flexible suspension springs are employed and the shock absorber is designed, as preferred, to adequately supplement the resistance of the springs to compression when obstructions are encountered, the force of this resistance afforded by the shock absorber is relatively large at its maximum and the resisting force afforded by the shock absorber to the rebound of the spring would probably never exceed the said maximum resistance to the compression of the spring and ordinarily would at all times be less than said maximum resistance, while it should, at the time the parts are at or near their normal position in the rebound movement materially exceed the minimum resistance afforded to the compression of the springs. I prefer to make the resistance to the rebound of the springs at the time the shock absorber parts are at or near, that is to say in the region of, their normal positions in the rebound movement moderate in comparison with the maximum resistances during spring compression and spring rebound yet decidedly greater than the minimum resistance afforded to the compression of the springs because the shock absorbers in this manner add greatly to the lateral stability of the vehicle, or in other words, greatly resist the tendency of the body of the vehicle to rock or sway. This feature of the apparatus is of marked importance when the shock absorbers are designed to operate upon a cycle including the features of the cycle disclosed in my aforesaid patent Reissue No. 17,409 since with such a cycle of operation the resistance of the shock absorbers to the compression of the springs when the parts are at or near their normal positions should be small and preferably practically unnoticeable or negligible in order that the advantage of the soft vehicle springs may be had, and consequently the said resistance to the compression of the springs is not sufficient to afford the lateral stability referred to and it is only by making the resistance to the rebound force of the springs amply large when the parts are at or near their normal positions that the said lateral stability is attained. On the other hand, it is desirable that the resistance to rebound movement of the piston in the region of its normal position should not be greater than may be necessary to insure stability of the vehicle body as comparative freedom of action in the suspension springs is desirable in the case of spring movements of moderate amplitude. My present instrument has the marked advantage that the moderate predetermined resistance to rebound movement of the piston in the region of its normal position is furnishd by a spring-pressed valve which, as will later be explained, is adapted to maintain such resistance substantially constant for a given speed of piston movement notwithstanding variations in the viscosity of the liquid and yet quite ample resistance to the rebound of the springs, even for spring movements of the widest amplitude, is assured by the automatic action of the tapered groove 22ª. In this connection it will be understood that the dissipation of energy effected by the tapered groove during spring compression correspondingly reduces the amount of energy that need be dissipated during spring rebound in order to secure adequate damping of the springs.

The character of the forces set up in the pressure chambers A and B of the preferred form of the device is illustrated by the diagram shown in Fig. 11. In this diagram the forces are measured vertically above and below the horizontal line or axis $x$—$x$. The vertical line $y$—$y$ represents the normal position of the shock absorber piston 6 and movement of the piston in either direction from that normal position is measured horizontally on the axis $x$—$x$. In the diagram, the full line curve $a$ and the dotted lines $b$ and $c$ represent three complete cycles of the piston movement such as occur when the wheels of the vehicles strike an upwardly projecting obstruction, the curve $a$ corresponding to a larger obstruction than the curves $b$ and $c$ or to an obstruction encountered at greater speed than that represented by the curve $b$. Considering the full line curve $a$, it will be observed that when the obstruction was encountered there was a considerable downward movement of the piston 6 during which there was very slight resisting pressure set up in the chamber B, this pressure being represented by the practically horizontal section $a^1$ of the curve $a$ to the right of the vertical line $y$—$y$. However, as the downward movement of the piston 6 continued, the rapidly tapering end portion of the valve groove 22ª caused a rapid increase of the pressure in the chamber B which is represented by the sharply upwardly inclined portion $a^2$ of the curve. The pressure reaches its maximum value at the point $a^3$ near the end of the downward movement of the piston 6 and then, as the speed of the piston movement rapidly diminishes, the pressure in the chamber B correspondingly rapidly falls as indicated by the portion $a^4$ of the curve, the pressure falling to zero of course at approximately the end of the piston movement. At this point the rebound movement of the spring 3 begins, causing a reversal of the movement of the piston 6 and the relatively rapid building up of pressure in the chamber A which is represented by the portion $a^5$ of the curve. Since the curve represents an extreme compression of the vehicle springs, the groove 22$^a$ was covered by the downward movement of the piston represented by the portion $a^2$ of the curve, and consequently at the beginning of the rebound the pressure in the upper chamber A is determined both by the resistance of the valve spring 21 and the throttling effect of the groove 22$^a$. However, as the rebound movement proceeds the groove 22$^a$ is gradually uncovered and as a result the resistance to the further movement of the piston is determined entirely by the tension of the valve spring 21 and this resistance is represented by the portion $a^6$ of the curve. This latter resistance to the rebound of the spring continues with relatively small diminution until the vehicle and shock absorber parts have returned to their normal positions represented by the line $y-y$. The momentum of the parts moved by the rebound or expansion of the springs carries said parts beyond their normal positions and the pressure in the chamber A continues but with diminished intensity as indicated by the section $a^7$ of the curve to the left of the line $y-y$, the pressure returning to zero at or near the end of the rebound movement. From this latter point the parts are returned again to normal position, the piston 6 moving downward and creating the very slight pressure in the chamber B represented by the section $a^8$ of the curve.

The dotted line curve $b$ in the diagram, Fig. 11, represents the pressures set up in the chambers A and B when the vehicle encounters a lesser shock or obstruction than that represented by the curve $a$ and the dotted line curve $c$ similarly represents the pressures set up by a still smaller shock. The curve $b$ is of the same general character as the curve $a$, but inasmuch as the movement of the parts during spring compression was not sufficient to cause the piston to cover much of the groove 22$^a$ the pressures represented by that part of the curve corresponding to the part $a^5$ of the first curve are moderate, the hydraulic resistance to the rebound being determined largely by the tension of the valve spring 21. The movement of the parts represented by the curve $c$ was not sufficient to cause the piston to cover the groove 22$^a$ or to cover it enough to have any appreciable effect upon the hydraulic pressures set up by the movement. Consequently, in this last case, the effect of the tapered groove represented by the part $a^5$ of the full line curve is wholly absent. In the case of all of the curves it will be understood that the hydraulic pressures generated are affected in some measure by the speed at which the piston moves as well as by the capacity of the passages through which the working liquid flows. Thus the high speed of the piston movement caused by the sudden encountering of a severe shock is in part responsible for the steep slope and height of the section $a^2$ of the curve $a$ and the lower speeds of piston movement represented by the curves $b$ and $c$ are responsible in part at least for the lower pressures indicated by these curves.

While the curve representing the cycle of force variations will vary in form with the speed of the vehicle and the contour of the road, curves $a$, $b$ and $c$ represent the usual forms and may be taken as typifying in general the various forms that may result from variations in the various determining factors of speed, road, etc.

The size and taper of the valve groove 22$^a$ in the front plate 3 of the casing are preferably determined empirically to suit the conditions of operation determined by the size and weight of the vehicle upon which the shock absorber is to be used. However, the effect of the groove 22$^a$ can be varied materially by changing the angular relation of the piston 6 to the crank arm 8. Thus if the angular position of the piston is moved upward in relation to the crank arm 8, the piston will cover the groove 22$^a$ later in its movement, while if the position of the piston is adjusted downward it will cover the said groove earlier in its movement.

Similarly the tension of the valve spring 21 should be empirically determined in order that the valve 20 may afford the desired resistance to the rebound of the springs. When once the proper tension of the spring has been determined for a given vehicle the resistance to rebound afforded by valve 20 is automatically maintained at nearly constant value for a given piston speed, regardless of temperature changes from day to day and with the changing seasons of the year, since the action of the spring pressed valve automatically adjusts itself to varying pressures incident to changing viscosity of the working liquid and thus approximately compensates for variations in the viscosity. Consequently when the shock absorber is once adjusted to meet the requirements of a particular vehicle, further adjustments during service of the apparatus are not required.

In the operation of the shock absorber any leakage of liquid that may occur from the pressure chambers A, B through the joints between the casing parts 1, 2 and 3 is promptly compensated for by replenishment from the reserve reservoir C through the passage 24. Thus such slight leakage from the working chambers as may occur in this manner is unobjectionable since leaking liquid is received in the reservoir C and no loss to the outside occurs. The liquid that may in slight amount leak from the pressure chambers through the joint between the casing parts 1 and 2 cannot penetrate the rear plate 1 through the dowel bolt holes because of the very tight forced fit of the dowel bolts in said rear plate. Such leakage as may occur through bolt holes in the front plate 3 is immaterial because the front plate is entirely enclosed in the reservoir space so that the leakage is caught in the reservoir.

Any air in the reservoir C that may be dissolved in the working liquid therein and thus find its way in small amounts through passage 24 into the pressure chamber B is very soon expelled from this chamber into the upper pressure chamber A and, rising to the top of this latter chamber, is on the first upward movement of the piston expelled through the capillary passage 23, the small caliber of the passage preventing the escape of any substantial amount of liquid during the relatively brief periods of pressure.

Since any liquid leaking from the pressure chambers A and B enters the reservoir C and is thence returned to the pressure chambers, it is obvious that any actual loss of the liquid fluid can only occur through the packing between the shaft and the casing member 9. Any such leakage is reduced to an absolute minimum by my improved form of packing. Indeed, this packing has, under test, shown prolonged service without any measurable leakage whatever. The slight wear that may occur in the packing rings is compensated for by the expansion of the spring disks 12 and the packing is thus adapted to remain effective indefinitely, or as long as any such instrument will remain in operation. The packing is thus peculiarly adapted to use in an instrument which is permanently closed.

It will be seen that it is quite easy to effect removal of any of the parts in the bore 13 of the front plate 3 of the casing for any purpose, such as modification of the tension of the spring 21 to modify the action of the instrument or for repair or renewal of any of said parts. While the working parts in the bore 13 are completely enclosed within the reservoir C their removal from the reservoir is readily permitted by simply removing the filling cap 9c. Obviously if any slight leakage of liquid should occur past the plug 18' such leakage is received in the reservoir C and is not lost to the outside of the instrument.

The provision of the passages 7b and 7c in the piston shaft, by obviating all unbalanced pressure on the piston, reduces to an absolute minimum wear between the sides of the piston and the side plates of the casing. Without these relief passages liquid would slowly leak through the rear bearings and, accumulating at the back end of the shaft, would cause an unbalanced pressure of the piston against the front plate 3 during working strokes of the piston and this obviously would tend to cause wear between the front side of the piston and the said plate 3 of the casing. As stated, this is obviated by the construction described, and as a result the casing parts of the apparatus can satisfactorily be made of materials having lower wear resisting qualities than would otherwise be possible. For example, with my improved construction I have found it feasible to make the front plate 3 of the casing structure of die cast metal.

The advantages incident to my improved form of casing construction will not be fully appreciated without reference to the methods of manufacture which this construction makes possible. In prior shock absorbers of the swinging piston type the casing structure has presented serious manufacturing difficulties. These difficulties in my improved construction are overcome. It will be observed that by making the main casing forming the working chambers in three parts, 1, 2 and 3, it is possible to have the two joints between these three parts formed by plane surfaces which of course can be accurately machined with great ease and rapidity. Furthermore, this construction permits the machining of the entire peripheral wall of the working chamber of the casing by a simple broaching operation. That is to say, the working surfaces 2a and 2b of the member 2 can be simultaneously finished by a single broaching tool.

In the machining of the three casing parts in question, I have devised an improved method to insure proper alignment and relative positioning of the two shaft bearings with the surfaces 2a and 2b of the casing. The procedure is as follows: First the plane surfaces of the three casing parts 1, 2 and 3 are machined and the internal surfaces of the intermediate part 2 are broached. The holes for the cap screws and the dowel bolts are then drilled in the back plate and the front plate, the bolt holes being drilled about 1/32" under size and the screw holes in the front plate about 1/32" over size, and the screw holes in the back plate are tapped. The back plate is then placed in a fixture which locates the plate in relation to the bolt holes therein and the rear bearing recess is bored out, the bushing thereof inserted and finish bored. Then, in the same manner, the shaft bearing of the front plate is machined. The middle casing part 2 is placed in a fixture which locates the part with respect to the broached surfaces thereof and the holes for the cap screws and the dowel bolts are drilled. The bolt holes are drilled about 1/32" under size and the screw holes about 1/32" over size, as in the case of the front plate of the casing. Next the three casing parts 1, 2 and 3 are assembled and secured rigidly together upon what I term an assembly plug which is similar to the combined piston and shaft of the shock absorber except that the vane or piston part is made of a circumferential extent great enough to substantially fill the working chamber of the shock absorber and that the plug is made of such a size that its bearing surfaces which engage the peripheral surfaces 2a and 2b of the casing part 2 fit the latter with a smaller clearance than do the corresponding surfaces of the piston. This assembly plug, being made very accurately, serves to very accurately position the surfaces 2a and 2b of the intermediate casing part in relation to the shaft bearings of the casing parts 1 and 3. The drilled holes of the three casing parts are then brought into alignment with each other by inserting a pin through one of the sets of holes and then while the three casing parts are clamped rigidly together the dowel bolt holes are brought to their final finished size by reaming, the bolt holes in the back plate 1 being preferably finished to a somewhat smaller size than the bolt holes in the other two casing members so that the dowel bolts when they are inserted in the assembled casing will have a heavy pressed fit in the back plate that will insure a leak tight joint or engagement between the bolts and the said back plate. With the casing parts thus machined, it is obvious that when the shock absorber is assembled the insertion of the dowel bolts will position the three casing parts with a high degree of accuracy in their proper relation to each other.

It will be obvious to those familiar with modern machine tool practice that my improved casing structure can be machined in the manner described with very great ease and facility with a high degree of accuracy and uniformity so that a nice working fit between the bearing or working surfaces of the piston and shaft member and of the casing is insured.

The machining of the peripheral walls of the sector-shape chamber of the main casing of the shock absorber is highly advantageous because it combines low cost with a high degree of accuracy. This method is made possible by the three-part construction of the main casing and by the novel method of machining the dowel holes with reference to the broached surfaces. By combining with these features the outer welded-on casing member 8, I provide a reserve reservoir of large capacity, obviate the necessity of making the joints between the three casing parts 1, 2 and 3 absolutely liquid tight and secure a structure with a smooth and highly pleasing exterior.

The combined piston and shaft may be finished to size by known methods of machining parts of this character.

Aside from the piston, all of the moving or working parts of the shock absorber are mounted in the front plate 3 of the casing and practically all of the machined passageways required to afford and control the flow of liquid between the respective chambers of the shock absorber are in this casing plate 3. This is an important factor in facilitating and minimizing the cost of manufacture as will readily be appreciated. Furthermore, the working parts mounted in the front plate 3 of the casing are for the most part of such a character that they can be made upon machine tools of the screw machine type, thus additionally facilitating and reducing the cost of manufacture. It will be observed that the grooves 19ª and 22ª formed on the inner face of the casing plate 3 are arranged parallel to each other, thus making it possible to form these grooves simultaneously by a milling operation.

By arranging the piston shaft eccentrically in a circular casing structure, I attain at the same time a high degree of compactness and marked facility in the welding of the joint 10 between the back plate 1 and the cupped member 9 of the casing structure. The disposition of the major part of the reservoir space C between the front face of the casing part 3 and the cup part 9 permits both adequate reservoir capacity and radial compactness of the instrument. Such radial compactness is important both because of the practical necessity of mounting the rear instruments of an automobile in the channels of the chassis frame members and also because radial compactness thus secured makes possible lower weight and lower cost for the instrument.

Another advantage of the eccentric arrangement of the shaft in the casing arises from the fact that said arrangement permits the link, which is used to join the end of the crank arm 8 to the axle of the vehicle, to be disposed in a plane intersecting the casing of the shock absorber and yet be permitted to move relatively close to the axis of the shock absorber shaft as the vehicle spring is compressed. As this spring-compressing movement of the parts occurs, the effective lever arm of the crank 8 diminishes, reaching its minimum at the time the hydraulic resistance of the shock absorber to the compression of the vehicle springs is at a maximum. In other words, as the pressure in the chamber B rapidly increases (as shown by the section $a^2$ of the curve in Fig. 11) to its high maximum value the mechanical advantage with which the spring compressing force is applied from the vehicle axle to the piston 6 of the shock absorber is simultaneously diminished by the change of the angular relation between the link and the crank arm 8 so that the size and strength of the liquid pressure parts of the shock absorber and apparatus can be made substantially smaller than would be feasible if the said mechanical advantage were not changed as described, and still be adequately strong to perform their functions. The broader aspects of this feature are claimed in my Patent Reissue No. 17,409 and my pending application Serial No. 320,413. This type of construction has very distinct additional advantage in a shock absorber designed to resist the pressure forces of a soft vehicle spring. That is to say, the single vane form of construction is peculiarly adapted to furnish the very great resistance capacity necessary for such service since with it the necessary capacity can be secured with a casing structure smaller, more compact, lighter in weight and less costly than is possible where a multiple vane construction is used, because the capacity of a vane type piston varies as the square of its means effective radius and my studies have shown that because of this principle a distinctly higher degree of compactness can be obtained for high capacity shock absorbers by the use of a single vane piston.

In Figs. 12 to 15 inclusive I have illustrated a form of shock absorber of the same general character as that illustrated in Figs. 1 to 11 but the construction in the second form has been modified with a view to reducing the overall axial dimension of the instrument to a minimum and so adapting the instrument to use upon cars where, for one reason or another, the space available for the mounting of the instrument is closely limited. However, some features of the construction embodied in the second form have no essential relation to this consideration.

Referring in detail to the construction of the second form of shock absorber, it will be observed that the casing structure of the instrument comprises parts 31, 32 and 33 of the same general character as the corresponding casing parts 1, 2 and 3 of the first form of construction, though, for reasons which I will later explain, the rear plate 31 is thicker than the corresponding rear plate 1 of the first form of construction and the bearing boss of the front plant 33 is considerably shorter than the bearing boss of the front plate 3 of the first construction. The three casing parts are tightly and rigidly secured together by cap screws 34 and dowel bolts 35, these screws and bolts being fitted in the casing parts in the manner explained in connection with the first form of construction. The dowel bolts 35, as in the first form of construction, serve to secure the instrument to the vehicle as well as helping to clamp the parts of the casing structure together. Lock washers 34ª are interposed between the head of the cap screws and the front casing member 33. In the sector-shape working chamber of the three-part casing structure is fitted the swinging piston or vane 36 which is connected rigidly and preferably integrally to the shaft 37 which extends through the front casing plate 33 and is rotatably supported in a bearing boss 33ª thereof. The rearwardly extending shaft section 37ª is rotatably supported in a bearing 31ª formed in the back plate 31 of the casing. In this construction the bearing is bored or drilled entirely through the back plate and the hole is then tightly closed by the insertion of a Welch plug 31ᵇ. The shaft is formed with an axial bore 37ᵇ and a radial hole 37ᶜ to prevent the accumulation of pressure at the rear end of the shaft, for the purpose explained in connection with the first form of construction. In other respects the piston is of the same construction as that in the first described instrument and need not be further described.

A crank arm 38 is mounted on the outer end of the shaft 37 and it is to be understood that this crank is suitably connected by a link to the axle of the vehicle. It will be observed, however, that in this case the crank 38 is connected to the shaft so as to extend from the same side thereof as does the piston or vane 36. The reason for this will later be explained.

The casing structure includes an outer cupped part 39, preferably stamped or pressed from sheet steel. The casing part 39 is formed with an outwardly turned flange 39ª which is welded to an outwardly turned flange 31ᶜ of the back plate 31 so as to connect the two parts with a liquid tight joint.

A packing, designated in its entirety by the numeral 40, is provided between the shaft 37 and the casing part 39. This packing comprises an annular ring 40ª of cork which is surrounded by a thin metal ring 40ᵇ which limits its outward expansion. It also comprises a ring 40ᶜ, preferably of rubber, which engages the inner side of the cork ring 40ª, and the rubber ring is fitted with a metal ring or washer 40ᵈ which engages the inside and the outer periphery of said ring so as to limit the outward expansion thereof. The inner side of the washer 40ᵈ is engaged by a spring disk 41, the outer flanged periphery of which bears against the heads of one of the dowel bolts and two of the machine screws and against two small bosses 33ᵇ formed on the casing plate 33. The disk is notched to form a series of inwardly projecting fingers 41ᵃ and its free or unflexed form is such that when the parts are assembled as shown in Fig. 12 the fingers of the disk are flexed to exert a spring pressure upon the packing rings 40ᵃ and 40ᶜ. A single spring of this character is even more compact axially than the double spring construction shown in the first form of shock absorber. As in the first form of construction, the axial pressure exerted by the spring on the packing rings serves to press them into close engagement with the shaft and with each other and also to press the packing ring 40ᵃ into close engagement with the casing 39 adjacent the shaft.

The piston 36 divides the sector-shape cavity of the casing into a pressure chamber A' below the piston and a pressure chamber B' above the piston; and an irregular shaped reservoir chamber C' is provided between the inner casing structure made up of the parts 31, 32 and 33 and the cupped outer casing member 39. The member 39 is provided at its upper side with a filling aperture and a suitable screw closure therefor 39ᶜ to provide for the introduction of working liquid into the shock absorber. In the operation of this form of shock absorber, the pressure in the lower chamber A' resists the downward movement of the piston to check the rebound of the vehicle springs, while pressure in the upper chamber B' serves to resist the upward movement of the piston to check and control the operation of the vehicle springs. In this second form of instrument the passages and devices which afford and control the flow of liquid between the pressure chambers A' and B' are formed or mounted in the rear casing plate 31. Said plate is drilled out to form a bore 42. The upper end of this bore is closed by a screw plug 43, the lower tapered side of which tightly engages a shoulder at the upper end of the bore. The plug is preferably formed with an out-of-round recess in its upper side to receive a tool by which it can be inserted and removed. Near the upper end of the bore 42 a passage 44 is drilled in the back plate 33 to afford communication between the upper pressure chamber B' and the said bore 42; and the passage 44 terminates in a tapered groove 44' formed on the inner face of the plate 33 as shown in Fig. 14. The lower end of the bore 42 terminates in a section 42ᵃ of reduced diameter and this lower section of the bore communicates through a passage 45 with the lower pressure chamber A'. A shoulder 42ᵇ is formed in the bore 42 that serves as a seat for a valve which is designated in its entirety by the numeral 46 and which comprises a tubular valve proper 46ᵃ, a tubular body 46ᵇ within which the valve member 46ᵃ is secured with a forced fit, and a ball check valve 46ᶜ which is disposed within the valve body 46ᵇ and seats upward to close the passage through the tubular valve. The inner end of the valve member 46ᵃ is notched (see Fig. 13ᵃ) so that the check valve 46ᶜ cannot close the passage through the member 46ᵃ and the valve body 46ᵇ is formed with small radial holes 46ᵇ' through its side walls, thus affording in effect a by-pass passage of very small capacity around the valve 46ᵃ. The valve 46 is pressed yieldingly against its seat 42ᵇ by an elongated coil spring 47 which, at its upper end, abuts against the plug 43. This spring when expanded is of such a length that it is compressed and preloaded when assembled in the bore between the valve 46 and screw plug 43. The spring pressure upon the valve 46 can be varied by substituting a spring of different size or by interposing washers between the spring and either the valve 46 or the screw plug 43.

The pressure chamber B' is connected at its upper side through a capillary passage (not shown) similar to the passage 23 of the shock absorber first described. Also the lower pressure chamber A' has communication at its lowest point with the reservoir chamber C' through a passage 48 which is formed in the front plate 33 and which is controlled by a ball check valve (not shown), the construction of this valved passage being similar to that of the passage 24 of the first shock absorber as shown in Fig. 6.

In the operation of this second form of the apparatus, hydraulic forces which are set up by the movement of the piston act to control the movement of the vehicle springs in the same manner as in the case of the shock absorber first described. Accordingly a brief description of the operation of the second instrument will suffice. Inasmuch as the piston 36 and the arm 38 extend from the same side of the piston shaft, the piston is moved upward during compression of the vehicle springs. This movement causes a flow of oil from the chamber B' through the various passages, including the bore 42, to the chamber A', the resistance to this flow being determined by the gradual covering of the groove 44' by the piston 36, this throttling action occurring only during the latter part of the movement so that the first part of the spring compression is not resisted by the shock absorber. On the rebound of the springs the piston moves downward and the flow of liquid is now from the chamber A' in the reverse direction through the passages to the chamber B'. Here, as in the first form of construction, the resistance is determined by the tension of the spring 47, though in the case of a wide upward swing of the piston during compression of the vehicle springs the throttling action of the tapered groove 44' affects the resistance to the rebound during the first part of the rebound movement just as in the first form of construction. Indeed, the diagram of forces in Fig. 11 represents the operation of the second form of shock absorber as well as the first.

In the operation of this second form of the instrument, the relative arrangement of the piston and the crank arm 38 results in bearing loads on the shaft of quite a different character from those which exist in the first form of construction. In the second construction the bearing loads are such as to require a bearing of substantially larger capacity in the rear casing plate than in the case of the first form of construction. This requirement is met in the second form of construction that has been described by making the rear casing part 31 thicker than the rear plate of the first described instrument. The added thickness so given to the rear plate 33 adapts the latter to accommodate the passages and devices for controlling the flow of liquid between the pressure chambers A' and B' and inasmuch as a relatively short shaft bearing in the front plate 33 of the casing structure suffices with the present arrangement of piston and crank arm the arrangement of the control passages and devices in the rear plate, instead of the front plate permits the overall axial dimensions of the front plate to be reduced to a considerably greater extent than the thickness of the rear plate is increased, with resultant substantial reduction in the over-all axial dimension of the instrument. It may be observed that this reduction in the overall dimension of the instrument is contributed to by forming the casing member 39 with only a very shallow annular recess to receive the packing ring 40ª and providing the metal ring 40ᵇ to prevent undue radial expansion of the packing ring 40ª.

This second form of shock absorber obviously has most, if not all, of the advantages, incident both to manufacture and to operation, possessed by the first form and these will be obvious without further comment.

The third form of shock absorber illustrated in Figs. 16 to 22, inclusive, is also disclosed in my copending application Serial No. 320,413 in which certain features thereof are claimed. Referring in detail to this third form of construction, there is a casing structure which comprises a rear plate-like part 51 which is preferably a steel forging, an intermediate part 52 which may be a steel forging or a malleable casting, and a front plate-like part 53 which is preferably a steel forging but may be a malleable casting. The parallel side surfaces of the intermediate casing part 52 nicely fit the adjacent plane surfaces of the rear and front parts 51 and 53 and the three parts are tightly and rigidly secured together by cap screws 54, 54 and dowel pins 54ª, 54ª. The dowels fit apertures in the three casing parts and the cap screws pass through apertures in the front part 53 and the intermediate part 52 and engage threaded blind or closed bottom holes in the rear part 51. Further reference will be made to these parts later in the description. The part 51 has lugs 51ª, 51ª to receive securing bolts 55 by which the instrument is secured to the side frame of the vehicle. The casing structure includes additional parts which will presently be described.

On reference to Figs. 16, 17 and 18 it will be observed that the intermediate casing part 52 forms the peripheral wall of an approximately sector-shaped chamber. In this chamber is fitted a piston 56 of the vane or swinging type. The piston is connected rigidly and preferably integrally as shown to a shaft 57 which extends through the front casing member 53 and is rotatably supported in a bearing boss 53ª thereof which is fitted with a bushing 53ᵇ. A rearwardly extending shaft section 57ª has a bearing support in a hollow boss 51ᵇ formed on the casing part 51 and fitted with a bushing 51ᶜ. The piston 56 comprises a vane part 56ª having a web and flange construction which is clearly shown in Figs. 17 and 19, and a hub part 56ᵇ which carries the vane and which is somewhat greater in diameter than the shaft 57. The peripheral wall of the sector-shaped chamber of the casing is formed with a hollow cylindrical extension at 52ª to accommodate the hub part 56ᵇ of the piston (Fig. 17). The chamber wall at 52ª and the peripheral wall thereof at 52ᵇ, the inner plane surfaces of the casing parts 51 and 53 and the various surfaces of the piston which are adjacent to and cooperate with these casing surfaces are all carefully machined or finished, as hereinafter explained, to afford working fits between the piston and the walls of the casing chamber that will prevent undue leakage of the working fluid from one side of the piston to the other.

A crank arm 58 is mounted on the outer end of the shaft 57, the shaft and the aperture of the crank arm being toothed or serrated at 59 so that the crank can be placed on the shaft and rigidly held against turning in different angular positions in relation to the shaft and the piston 56. The crank is secured against axial movement on the shaft by a closed nut 60 which engages the threaded end of the shaft and a washer 61 of soft metal or other suitable material is interposed between the nut and the outer face of the crank arm so as to seal tightly the joint between the crank arm and the shaft.

The crank arm 58 is designed to have its outer end connected in any well known manner with a link (not shown) which in turn is connected to the axle of the vehicle.

To provide a reserve reservoir for working fluid and at the same time afford a liquid tight closure for the entire apparatus, the casing structure also includes an outer cupped part 62 which can appropriately be stamped or pressed from sheet steel. The rear open end of the cupped casing part is formed to snugly fit the periphery of the rear casing part 51 and is rigidly secured to the latter part with a liquid-tight joint. Such a joint can be formed in various ways, but I prefer, as in the other forms of construction, to make the connection by forming a welded or brazed joint 63 by the use of methods and apparatus known in the art.

At its front side the casing member 62 is formed with a large aperture and a flange 64 which surrounds the bearing boss 53ª of the casing with an interposed annular space in which is arranged a packing designated as an entirety by 65. This packing comprises a tubular metal ring 65ª, two packing rings 65ᵇ and 65ᶜ of relatively soft liquid proof or liquid repellant material, such, for example, as rubber, also a metal ring 65ᵈ interposed between the rings 65ᵇ and 65ᶜ and a second metal ring 65ᵉ on the inner side of the ring 65ᶜ. The tubular ring 65ª loosely surrounds the bearing boss 53ª and is formed with an outwardly turned flange 65ª′ which engages the adjacent inner face of the crank arm 58. The ring 65ª may suitably be made of brass. The soft packing ring 65ᵇ has its outer surface pressed outward against the adjacent inner face of the crank arm 58 at points radially outside of the flange 65ª′. A strong coil spring 66 interposed between the casing member 53 and the packing ring 65ᵉ serves to press the entire packing 65 outward against the crank arm 58 and at the same time expand the soft packing rings 65ᵇ and 65ᶜ radially into tight engagement with the outer side of the metal ring 65ª and the inner side of the flange 64.

As indicated in Fig. 17, the piston 56 divides the sector-shaped cavity of the casing structure into a chamber A″ above the piston and a chamber B″ below the piston; and, as is clearly shown in Figs. 16, 17 and 18, a relatively large irregular chamber C″ is provided between the cupped outer casing member 62 and the inner casing structure made up of the parts 51, 52 and 53. In the operation of the device the chambers A″ and B″ and the chamber or reservoir C″ are occupied by a body of liquid which constitutes the working fluid of the device, glycerin or oil of suitable consistency being preferably employed. The casing member 62 is provided at its upper side with a filling aperture having a suitable screw closure 62ᵃ to provide for the introduction of the liquid. In the operation of the device the chamber A″ constitutes a pressure chamber for resisting the upward movement of the piston 56 and thus checking rebound of the vehicle springs while the chamber B″ serves as a pressure chamber to resist the downward movement of the piston 56 to check and control the compression of the vehicle springs. The features of the construction by which these functions are accomplished will now be explained. On comparison of Figs. 16, 17, 18 and 19 it will be observed that the shaft 57 of the piston is formed with a large axial bore 67 which extends substantially through the piston hub section of the shaft and opens through the end of the shaft section 57ᵃ. As shown in Fig. 19, the hub of the piston is formed with a radial passage 68 which leads from the pressure chamber A″ into an annular enlargement 67ᵃ of the axial bore 67. And at approximately right angles to the passage 68 is a radial passage 69 in the hub of the piston, said passage leading from the axial passage 67 to the pressure chamber B″. In the passage 69 is a spring pressed check valve 70 which permits flow only in a radially outward direction through the passage 69. The conduit formed by the passages 68, 67 and 69 is controlled by a valve means comprising a valve body or valve proper 71. The valve body 71, which is made of metal, is tubular in form with one end open and the other closed. The open end 71ᵃ of the valve is of larger diameter than the closed end portion 71ᵇ, the diameter of the larger end 71ᵃ being such as nicely to fit the bore 67 of the piston while the diameter of the smaller part 71ᵇ is such as to afford a relatively large annular space between it and the wall of the bore 67. The sharp annular shoulder 71ᶜ at the junction of the larger and smaller parts of the valve serves, in conjunction with the wall of the annular enlargement 67ᵃ, to nicely control liquid flow from the chamber A″ through the passages 68, 67 and 69 to the chamber B″. The position of the valve 71 in the passage 67 is determined by an elongated thermostatic member 72 which serves in effect as the stem of the valve. The valve stem or member 72 as shown is in the form of a cylinder or rod of material having a coefficient of thermal expansion differing largely from the metal composing the piston and its shaft. The material which I preferably employ for this purpose is ebonite which has a coefficient of expansion very much higher than that of iron or steel and is substantially unaffected by most liquids and chemicals. It will be noted that the valve stem 72 at one end fits within the smaller section of the valve 71, engaging the closed end of the latter, and from this point it extends throughout the length of the passage 67 and substantially through the shaft 57 which is bored out at 73 to receive it with an easy fit, the outer end of the bore being threaded to receive a screw plug 74 which serves as an adjustable abutment for the outer end of the valve stem. The plug 74 can be held in adjusted position by peening or by making it with a tight fit. At the inner end of the valve 71 and interposed between it and the adjacent inner surface of the bearing boss 51ᵇ is a four-armed spring 75 which yieldingly presses the valve and the valve stem against the adjustable abutment 74. On reference to Figs. 17 and 19, it will be noted that the periphery of the hub portion of the piston is formed with a circumferentially extending tapered groove 76 which communicates at its deeper end with a passage 77 extending radially inward from the groove 76 to the axial bore or passage 67; and diametrically opposite the passage 77 is a passage 78 leading from the passage 67 into the pressure chamber A″, this latter passage being controlled by a check valve 79 which opens radially outward and permits flow only in that direction. It will thus be seen that the groove 76, passage 77, passage 67 and passage 78 constitute a conduit affording communication between the pressure chamber B″ and the pressure chamber A″ and that the effective capacity of this conduit varies with the angular position of the piston 56 since the movement of the piston brings different parts of the tapered groove 76 adjacent the lower edge of the chamber wall 52ᵃ. In other words, the tapered groove 76 acting in conjunction with the said lower edge of the adjacent wall surface 52ᵃ serves as a valve and diminishes the effective capacity of the outlet conduit of the chamber B″ as the piston 56 moves downward, as viewed in Fig. 17. The object of this is to gradually increase the resistance offered by the device to the compression of the vehicle springs.

From the foregoing it will be seen that the two main pressure chambers A″ and B″ are joined by two conduits, namely, that formed by passages 68, 67 and 69 and that formed by groove 76 and passages 77, 67 and 79, said conduits constituting parallel connections between the chambers A″ and B″.

While the thermostatic valve stem 72 is subject to the hydraulic pressure, this pressure is always that on the discharge or low pressure side of the throttle valves of the piston 56. Consequently the stem 72 could be made, if need be, of material liable to deformation under heavy pressure, because the construction above described wholly obviates such heavy pressure on the stem 72.

At the top of the pressure chamber A″ (Figs. 17 and 18) is an air bleeding passage 80 of small bore which leads from the chamber A″ to the reservoir chamber C″. This passage is controlled by a gravity check valve 81 in a manner which will later be described. At the bottom of the pressure chamber B″ is a small passage 82 which leads from said chamber to the reservoir chamber C″ and which is controlled by a gravity check valve 83.

In the manufacture of this last form of shock absorber the same general procedure may be followed as in the manufacture of the first described instrument, or a somewhat modified procedure may be followed as follows. I drill the holes in the intermediate casing part 52 and the front part 53 for the cap screws 54, 54 larger in diameter than the cap screws so that a small amount of float is possible between the three main elements of the casing. I determine and hold the alignment of these three casing elements by means of the dowels 54ᵃ, the holes for which in the three elements are located in the machining process in the following manner. In the rear plate 51 the holes for the cap screws 54 are drilled and tapped and the holes for the dowels 54ᵃ, as well as the bore designed to receive the bushing 51ᶜ, are machined in the same jig, the holes for the dowels being drilled about $\frac{1}{32}$″ under size. After the bushing has been pressed into place the inside bore of this bushing and the dowel holes are simultaneously bored so exact size in a three-spindle machine which will give exactly the correct spacing and diameter of these bores. Similarly the intermediate casing part 52 is first drilled with the holes for the cap screws 54 about 1/32" over size and the holes for the dowels 54ª about 1/32" under size, these holes being located from the inner finished surface 52ᵇ of the sector-shape wall of the casing member, said surface 52ᵇ and also the surface 52ª having been machined by a broaching operation. The dowel holes are then bored or reamed to exact size and at the same time the surface 52ª may, if desired, be additionally finish bored to correct for possible broaching errors. In the latter case the boring is done in a three-spindle boring machine, while if only the dowel holes are bored a two-spindle machine is used. In either case the part 52 is located in the jig from the surfaces 52ª, 52ᵇ thus insuring the exact relative location of the dowel holes and the surfaces 52ª and 52ᵇ. The front part 53 of casing can be machined in exactly the same manner as the back plate 51 or the following alternative procedure may be used. First the cap screw holes are drilled 1/32" over size, then the dowel holes are drilled 1/32" under size, then the dowel holes are finish bored and simultaneously the bearing boss 53ª is bored, all of these operations being performed in the same jig. Then, if desired, the part 53 may be hardened, preferably by a nitriding process, and finally the bushing 53ᵇ is pressed into place and burnished. With either procedure the shaft bearing of the plate 53 is located by a boring operation in the bearing boss and with either procedure the result is that upon the assembly of the three parts the dowels will hold these in such position that the bores of the two bushings and the axis of the surfaces 52ᵇ and 52ª will be in exact alignment. The plate 53 is hardened, as above stated, to prevent objectionable wear of the contacting surfaces of said plate and the piston 56 incident to the pressure of the spring 66.

As in the case of the other two instruments which have been described, this third form of shock absorber is designed for operation upon a cycle including the features disclosed in my United States Patent Reissue No. 17,409 previously referred to, although the apparatus can be designed as to size and proportion of parts, etc., to meet widely varying conditions of service.

The shock absorber is made ready for use by filling its working chambers with a suitable liquid such, for example, as oil or a 95% solution of glycerin and alcohol. The filling may be accomplished by removing the screw closure 62ª of the casing and pouring the liquid into the reservoir chamber C", meanwhile swinging the piston from its lowermost position to its highest position and if necessary repeating this movement several times until it is certain that sufficient liquid is drawn from the reservoir C" through the passage 82 into the lower chamber B" and from it forced into the upper chamber A" so that both chambers B" and A" are completely filled with liquid. It will be understood that when the piston 56 is swung from its lower to its upper position chamber B" is filled with liquid while air in the chamber A" is forced out through the passage 80 into the reservoir chamber C" and thence outward through the filling aperture, while on the downward movement of the piston 56 the liquid in the chamber B" is transferred through the passages in the piston to the chamber A". By repeating the movement of the piston it is insured that the chambers A" and B" are completely filled with liquid, and this having been done, the reservoir C" may also be nearly filled with the liquid to provide a reserve supply.

With the shock absorber mounted on the vehicle and the parts of the apparatus in their relative positions shown in Fig. 17 of the drawings, if the vehicle wheel strikes an obstruction the axle is lifted, the vehicle spring is correspondingly compressed and at the same time the crank arm 58 of the shock absorber is swung upward while the piston is swung downward from its normal position as shown in Fig. 17. At the beginning of the downward movement of the piston the liquid in the chamber B" offers little resistance to the movement of the piston because the capacity of the valve groove 76 is great enough to permit a relatively free outflow of the liquid from the chamber B" through said groove, passage 77, passage 67 and passage 68 into the upper chamber A", the check valve 79 opening to permit such movement of the liquid. However after the downward movement of the piston is continued for a certain distance corresponding to a certain compression of the vehicle spring the more rapidly tapering form of the valve groove 76 causes a greater and greater throttling of the liquid flowing from the pressure chamber B" so that energy is absorbed in this way at an increasing rate as the piston continues its movement and correspondingly increased resistance to the compression of the spring is afforded by the shock absorber. The resistance developed by the shock absorber will, of course, vary with the size of the obstruction and the velocity with which the vehicle strikes it. I prefer to design the parts and the clearances of the shock absorber so that it will offer sufficient resistance to the compression of the vehicle spring to enable it and said spring to fully absorb all shocks that will ordinarily be encountered by the driver of average care and rely upon the rubber bumper usually mounted on the vehicle axle to supplement the shock absorber and the spring in the case of the rarely encountered extremely heavy shock.

When the upward movement of the vehicle axle in relation to the vehicle frame ceases the vehicle spring starts to return to its normal loaded form and this "rebound" of the springs starts to swing the crank arm of the shock absorber downward and the piston upward. This movement of the piston places the liquid in the chamber A" under pressure and forces it through the piston passage 68, past the thermostatic valve part 71ᶜ into the passage 67 and thence through the passage 69 and past the check valve 70 into the pressure chamber B". The position of the thermostatic valve 71 is such that a sufficient resistance is offered to the outflow of the liquid from the chamber A" into the chamber B" to adequately check the rebound of the vehicle spring. When relatively soft and flexible suspension springs are employed and the shock absorber is designed, as preferred, to adequately supplement the resistance of these springs to compression when obstructions are encountered the force of this resistance afforded by the shock absorber is relatively large at its maximum and the resisting force afforded by the shock absorber to rebound of the spring would ordinarily not exceed the said maximum resistance to the compression of the spring, but would, at the time the parts are at or near their normal positions in the rebound movement, materially exceed the minimum resistance afforded to the compression of the spring.

Thus I secure, as explained in connection with the first described shock absorber, the full advantages of soft suspension springs for the vehicle without danger of "bottoming" and also secure adequate stability of the vehicle against side sway.

The character of the forces set up in the pressure chambers A'' and B'' is substantially the same as indicated by the diagram in Fig. 11, but with the exception that the pressure in the chamber A'' does not rise to such a great relative value at the beginning of the rebound movement as in the case of the first and second forms of instrument above described.

The size and taper of the valve groove 76 in the hub of the piston 56 are preferably determined empirically to satisfy the conditions of operation determined by the size and weight of the vehicle upon which the shock absorber is to be used. However the effect of the valve groove 76 can be varied quite materially by angularly adjusting the piston 56 in relation to the crank arm, this being accomplished by angular adjustment of the crank on the piston shaft which is permitted by the toothed or serrated surfaces of these parts.

Similarly the position of the valve 71 is empirically determined in order that it may afford the desired resistance to the rebound of the springs, the position of the valve, as previously described, being determined by the adjustment of the abutment plug or screw 74. When once this adjustment has been determined for a vehicle the resistance is automatically maintained at a nearly constant value, regardless of temperature changes. In the operation of the shock absorber when the piston starts its upward movement the pressure in the chamber A'' causes fluid in the chamber to enter the air bleeding passage 80. If any air has found its way into the chamber A'' it first passes the ball valve 81 and then as soon as liquid enters the passage 80 the ball valve is lifted by the flowing liquid against the seat above the valve thus effectively closing the passage 80 as long as pressure is maintained in the chamber A''. If during this upward movement of the piston liquid is not delivered from the chamber A'' into the chamber B'' rapidly enough to keep the latter filled, a corresponding lowering of the pressure in the chamber B'' results and thereupon liquid from the reservoir C'' is drawn past the check valve 83 through the passage 82 into the chamber B'' to make up the deficiency therein. When the piston moves downward the valve 83, of course, remains upon its seat and keeps the passage 82 closed.

In the operation of this last form of shock absorber, any slight leakage of liquid that may occur from the pressure chambers A'' and B'' is received into the reservoir chamber C'' from which the supply of liquid in the chambers B'' and A'' is constantly replenished. Leakage of liquid from the reservoir chamber C'' can only occur between the flange 64 of the casing member 62 and the adjacent face of the crank 58, and such leakage is practically completely prevented by the packing 65. This packing, I believe, has novel and advantageous characteristics. The spring 66 presses the packing as an entirety outwardly against the inner face of the crank arm. This has the effect of pressing both the metal flange 65$^{a'}$ and the outer side of the soft ring 65$^b$ against the said face of the crank arm; and it has the further effect of expanding the soft rings 65$^b$ and 65$^c$ laterally against the inner wall of the casing flange 64 as well as against the outer wall of the metal ring 65$^a$. The effect is to form liquid tight joints between the rings 65$^b$ and 65$^c$ on the one hand and the flange 64 and the ring 65$^a$ on the other hand and the friction between these parts is greater than that between the packing 65 and the face of the crank 58 so that the packing ring is held against turning and a sliding contact is maintained between the packing 65 and the crank 58 when the latter turns. In this connection it may be observed that the metal ring 65$^d$ tends to reduce the angular movement or distortion of the packing under reversals of the crank movement. At the beginning of the service of the device reliance can be placed upon the packing ring 65$^b$ of rubber or the like to maintain the joint between the packing 65 and the crank 58 tight and by the time wear of the packing 65$^b$ has occurred the metal flange 65$^a$ and the face of the crank 58 engaged by it will have worn in to form a good liquid tight metal-to-metal joint, and this joint is indefinitely maintained in the operation of the apparatus.

In the foregoing description of the different forms of construction I have mentioned the fact that any liquid that may leak from the working chambers through the joints of the inner casing structure will be received in the reservoir of the instrument and so be available to replenish the working chambers. However, there is a further and positive advantage incident to the casing construction which should be pointed out, namely, that yielding of the inner casing structure permitting leakage of liquids through its joints and increasing the clearance between the vane and the side walls of the casing when the pressure in either of the working chambers reaches a certain value affords an automatic control limiting the working pressures and consequently the resistance which the instrument can offer both to spring compression and spring rebound movements.

It will be observed that while in each of the first two forms of shock absorber described all of the passages, ports and valve devices controlling the flow of liquid between the two main pressure chambers were embodied in one of the casing parts, in the present form of instrument all such passages, ports and valve devices are formed or mounted in the piston structure. In either case the arrangement has the advantage of combining many of the machining operations in a single part of the apparatus and thereby facilitating manufacture.

It will be understood that the thermostatic type of valve shown in the shock absorber last described performs the same general function as does the spring pressed valve of the other two shock absorbers described, namely, the compensating for changes in viscosity of the working liquid so that the operation of the instrument is substantially unaffected by temperature changes.

It will be observed that in the case of each of the three instruments shown and described I provide means for controlling the flow of the working liquid under pressure which, in the case of suspension spring movements of wide amplitude, offers a resistance to some part of the piston movement corresponding to spring compression and spring rebound which is automatically varied with the intensity of the force causing the movement of the suspension spring and piston and which, in the case of spring and piston movements of lesser amplitude, offers to the liquid flow a more moderate resistance which is automatically maintained substantially constant for a given piston speed notwithstanding variations in the viscosity of the working liquid, this more moderate resistance being limited to movement of the piston in the spring-rebound direction. In the case of the first and second instruments described, the automatically varied resistance to the movements of wider amplitudes is distributed between the spring-compression stroke and the spring-rebound stroke of the piston, while in the case of the third instrument such resistance is confined to the spring-compression stroke. While, in a broad aspect of the matter, the resistance automatically varied with the intensity of the force causing the movement may be interposed either during spring compression or spring rebound providing the resistance is great enough to dissipate sufficient energy to afford adequate spring control, I prefer to dissipate some energy in this manner during spring compression as this permits the use of softer suspension springs and I also prefer to distribute this dissipation of energy between the spring-compression and spring-rebound strokes as the load upon the shock absorber is in this manner distributed and consequently more easily handled.

Certain broader aspects of the shock absorbers disclosed in this application, relating particularly to the valve devices, are not claimed herein as they constitute the subject matter of claims in my earlier application Serial No. 320,413 hereinbefore referred to. Also I do not claim in the present application the methods disclosed herein of fabricating my improved casing structure, as such methods constitute the subject matter of claims in my divisional application Serial No. 29,185, filed July 1, 1935.

It will be understood that the invention is not limited to the particular forms of construction which have been shown and described for purposes of explanation and illustration but that the construction shown can be varied widely within the scope of the appended claims.

What I claim is:

1. In a hydraulic shock absorber, the combination of a casing structure having a working chamber therein for a swinging piston and comprising parallel front and rear wall parts, an intermediate part forming the peripheral wall of the said chamber, means for securing the three said casing parts together, and a cupped outer casing part covering one of the parallel wall parts and the intermediate casing part with an intervening reservoir space and secured to the other of the parallel wall parts with a liquid tight joint; a swinging piston mounted in the working chamber of the casing; a shaft to which the piston is connected extending through one of the parallel wall parts of the casing with a bearing support therein; and means affording and controlling communication between the said reservoir space and the said chamber in the casing.

2. In a hydraulic shock absorber, the combination of a casing structure having a working chamber therein for a swinging piston and comprising parallel front and rear wall parts, an intermediate part forming the peripheral wall of the said chamber, means for securing the three said casing parts together, and a cupped outer casing part covering one of the parallel wall parts and the intermediate casing part with an intervening reservoir space and secured to the other of the parallel wall parts with a liquid tight joint; a swinging piston mounted in the working chamber of the casing; a shaft to which the piston is connected extending through one of the parallel wall parts and through the cupped part of the casing and having a bearing support in at least one of the casing parts through which it extends; and means affording and controlling communication between the said reservoir space and the said chamber in the casing.

3. In a shock absorber, the combination of a casing structure having a working chamber therein for a swinging piston and comprising a rear wall part, a front wall part, an intermediate part forming the peripheral wall of the said chamber, means for securing the three said casing parts together, and a cupped outer casing part covering the front and intermediate casing parts with an intervening reservoir space and secured to the rear wall part with a liquid tight joint; a swinging piston mounted in the working chamber of the casing; a shaft to which the piston is connected extending through the front wall part of the casing with a bearing support therein and through the cupped casing part; packing means for preventing leakage of liquid from the reservoir through the opening in the cupped casing part through which the shaft passes; and means affording and controlling communication between the said reservoir space and the said chamber in the casing.

4. In a hydraulic shock absorber, the combination of a casing structure having a working chamber therein for a swinging piston and comprising parallel front and rear wall parts, an intermediate part forming the peripheral wall of the said chamber, means for securing the three said casing parts together comprising a plurality of dowel members engaging the rear, front and intermediate casing parts to hold in proper alignment the bearing surfaces thereof engaged by the swinging piston and its shaft, and a cupped outer casing part covering one of the parallel wall parts and the intermediate casing part with an intervening reservoir space and secured to the other of the parallel wall parts with a liquid tight joint; a swinging piston mounted in the working chamber of the casing; a shaft to which the piston is connected extending through one of the parallel wall parts of the casing with a bearing support therein; and means affording and controlling communication between the said reservoir space and the said chamber in the casing.

5. In a shock absorber, the combination of a casing structure having a working chamber therein for a swinging piston and comprising a rear wall part, a front wall part, an intermediate part forming the peripheral wall of the said chamber, means extending from the front wall part to the rear wall part to secure the three said casing parts together, and a cupped outer casing part covering the front and intermediate casing parts with an intervening reservoir space and secured to the rear wall part with a liquid tight joint; a swinging piston mounted in the working chamber of the casing; a shaft to which the piston is connected extending through the front wall part of the casing with a bearing support therein and through the cupped outer casing part; packing means for preventing leakage of liquid from the reservoir through the opening in the cupped casing part through which the shaft passes; and means affording and controlling communication between the said reservoir space and the said chamber in the casing.

6. In a hydraulic shock absorber, the combination of a casing structure having a working chamber therein for a swinging piston and comprising parallel front and rear wall parts, an intermediate part forming the peripheral wall of the said chamber, means for securing the three said casing parts together comprising a plurality of bolts that pass through all three of said casing parts and have liquid tight connection with the rear wall part and project therefrom to afford means for attaching the casing structure to a vehicle part as well as helping to secure the casing parts together, and a cupped outer casing part covering one of the parallel wall parts and the intermediate casing part with an intervening reservoir space and secured to the other of the parallel wall parts with a liquid tight joint; a swinging piston mounted in the working chamber of the casing; a shaft to which the piston is connected extending through one of the parallel wall parts of the casing with a bearing support therein; and means affording and controlling communication between the said reservoir space and the said chamber in the casing.

7. In a hydraulic shock absorber, the combination of a casing structure having a working chamber therein for a swinging piston and comprising parallel front and rear wall parts, an intermediate part forming the peripheral wall of the said chamber, means for securing the three said casing parts together comprising a plurality of bolts that pass through the rear wall part with a liquid tight fit and project therefrom to afford means for attaching the casing structure to a vehicle part as well as helping to secure the casing parts together, and a cupped outer casing part covering one of the parallel wall parts and the intermediate casing part with an intervening reservoir space and secured to the other of the parallel wall parts with a liquid tight joint; a swinging piston mounted in the working chamber of the casing; a shaft to which the piston is connected extending through one of the parallel wall parts of the casing with a bearing support therein; and means affording and controlling communication between the said reservoir space and the said chamber in the casing.

8. In a hydraulic shock absorber, the combination of a casing structure having a working chamber therein for a swinging piston and comprising parallel front and rear wall parts, an intermediate part forming the peripheral wall of the said chamber, means for securing the three said casing parts together comprising a plurality of bolts having a thin coating of soft metal that pass through the rear wall part with a forced fit and project therefrom to afford means for attaching the casing structure to a vehicle part as well as helping to secure the casing parts together, and a cupped outer casing part covering one of the parallel wall parts and the intermediate casing part with an intervening reservoir space and secured to the other of the parallel wall parts with a liquid tight joint; a swinging piston mounted in the working chamber of the casing; a shaft to which the piston is connected extending through one of the parallel wall parts of the casing with a bearing support therein; and means affording and controlling communication between the said reservoir space and the said chamber in the casing.

9. In a hydraulic shock absorber, the combination of a casing structure having a working chamber therein and comprising a rear wall part, a front wall part, an intermediate part forming a peripheral wall of the said chamber, means for securing said casing parts together comprising a plurality of bolts that pass through all three of the casing parts and have liquid tight connection with the rear wall part and project therefrom to afford means for attaching the casing structure to a vehicle part, and a cupped outer casing part covering the front and intermediate casing parts with an intervening reservoir space and secured to the rear wall part with a liquid tight joint; a swinging piston mounted in the working chamber of the casing; a shaft to which the piston is connected extending through the front wall part of the casing with a bearing support therein and through the cupped outer casing part; packing means for preventing leakage of liquid from the reservoir through the opening in the cupped casing part through which the shaft passes; and means affording and controlling communication between the said reservoir space and the said chamber in the casing.

10. In a hydraulic shock absorber, the combination of a casing structure having a working chamber therein and comprising a rear wall part, a front wall part, an intermediate part forming a peripheral wall of the said chamber, means for securing said casing parts together comprising a plurality of bolts that pass through all three of the casing parts with fits adapting them to serve as dowels and that project from the rear plate part to afford means for attaching the casing structure to a vehicle part, and a cupped outer casing part covering the front and intermediate casing parts with an intervening reservoir space and secured to the rear wall part with a liquid tight joint; a swinging piston mounted in the working chamber of the casing; a shaft to which the piston is connected extending through the front wall part of the casing with a bearing support therein and through the cupped outer casing part; packing means for preventing leakage of liquid from the reservoir through the opening in the cupped casing part through which the shaft passes; and means affording and controlling communication between the said reservoir space and the said chamber in the casing.

11. In a hydraulic shock absorber, the combination of a casing structure having a sector-shaped chamber therein and comprising a circular rear wall part, a front wall part, an intermediate part forming the peripheral wall of the said chamber, the circular rear wall part being eccentric to the axis of the sector-shaped chamber, means extending from the front wall part to the rear wall part to secure the three said casing parts together, and a circular cupped outer casing part covering the front and intermediate casing parts with an intervening reservoir space and having its rear edge secured to the circular rear wall part with a liquid tight joint; a swinging piston mounted in the sector-shape chamber of the casing; a shaft to which the piston is connected extending through the front wall part of the casing with a bearing support therein and through the cupped outer casing part; packing means for preventing leakage of liquid from the reservoir through the opening in the cupped casing part through which the shaft passes; and means affording and controlling communication between the said reservoir space and the said chamber in the casing.

12. In a hydraulic shock absorber for vehicles, the combination of a casing having two pressure chambers therein for a working liquid; piston means operatively mounted for movement in said pressure chambers; means extending from the interior to the exterior of the casing for actuating the piston means; conduit means forming passageways for the flow of liquid into and out of each of the pressure chambers; means adapted to control the flow of liquid out of one of the pressure chambers corresponding to the compression of the vehicle spring and offer to the movement of the piston-actuating means a small resistance during the first part of the movement thereof from the normal intermediate position thereof toward one extreme and a gradually increasing resistance during the latter part of the said movement; and means comprising a spring-pressed valve adapted to control the flow of liquid out of the other pressure chamber and offer to the movement of the piston-actuating means in the reverse direction a moderate resistance to check the expansion of the vehicle spring when said piston-actuating means is in the region of the normal intermediate position thereof and further adapted automatically to vary the effective capacity of the passageway controlled by it approximately to compensate for variation in the viscosity of the liquid.

13. In a hydraulic shock absorber for vehicles, the combination of a casing structure having a working chamber for a piston; a piston operatively mounted in said working chamber; means having passageways affording egress for liquid from the working chamber when the piston moves in a direction corresponding to the expansion of the vehicle spring; and separate control means associated with said passageways adapted to offer resistance to such egress of liquid, one throughout such movement of the piston starting from its position corresponding to full compression of the vehicle springs and another in the first part only of such movement.

14. In a hydraulic shock absorber, the combination of a casing structure having two pressure chambers therein; piston means operatively mounted for movement in said pressure chambers; a conduit interposed between said pressure chambers; a valve removably mounted in the conduit for affording resistance to the flow of liquid therethrough in one direction; a check valve mounted in the first named valve to permit flow of liquid therethrough in the reverse direction; and means for offering a gradually increasing resistance to the flow of liquid in the last named direction as the piston moves.

15. In a hydraulic shock absorber, the combination of a casing structure having two pressure chambers therein; piston means movably mounted in said pressure chambers; a conduit interposed between said pressure chambers; means controlled by the liquid flow through said conduit and adapted to offer a large resistance to the liquid flow through the conduit in one direction and a lesser resistance to the liquid flow through said conduit in the reverse direction; and means independent of the last named means and controlled by the movement of the piston means for offering to the liquid flow through the conduit in said reverse direction resistance variable with the extent of said movement.

16. In a hydraulic shock absorber, the combination of a casing structure having therein a working chamber for a swinging piston and comprising a rear wall, a front wall and an intermediate peripheral wall; a swinging piston operatively mounted in the working chamber and dividing the latter into two pressure chambers; a conduit formed integrally with one of the front and rear walls and extending throughout the major part of its length substantially parallel to the plane of said wall, said conduit communicating at one end with one of the pressure chambers and at its other end with the other pressure chamber; and valve means removably mounted in said conduit comprising a spring pressed valve adapted to control the flow of liquid through the conduit in one direction and a check valve mounted in the first named valve to control the passage therethrough and permit flow of liquid through the conduit in the reverse direction.

17. In a hydraulic shock absorber, the combination of a casing structure having a working chamber therein for a swinging piston and comprising front and rear walls and an intermediate peripheral wall; a swinging piston operatively mounted in the chamber and dividing the latter into two pressure chambers; a conduit formed integrally with the front wall of the chamber and disposed parallel to the plane of said front wall, said conduit communicating at one end with one pressure chamber and at its other end with the other pressure chamber; valve means removably mounted in said conduit for controlling the flow of liquid therethrough; a cupped casing member forming a replenishment reservoir around the front wall of the working chamber; a filling aperture through the cupped member in line with the bore of the said conduit, whereby the valve devices in said conduit can be inserted and removed through said filling aperture.

18. In a hydraulic shock absorber, the combination of a casing structure having a plurality of intercommunicating chambers and formed of a plurality of separate parts, one of the separate casing parts being formed with a straight passageway therethrough to afford communication between two chambers of the casing and said passageway being formed between its ends with an annular shoulder to afford a valve seat, and another of the casing parts having a portion overlying one end of the passage; and a ball valve disposed in the passageway between the annular shoulder and the said overlying part of the casing.

19. In a hydraulic shock absorber, the combination of a casing structure having a working chamber therein for a swinging piston and comprising the rear wall, the front wall and the intermediate peripheral wall of the said chamber, and a cupped outer casing part forming a reservoir space between it and the said front wall of the casing structure; a swinging piston mounted in the working chamber of the casing; a shaft to which the piston is connected having a bearing support in a blind hole in the rear wall of the working chamber and extending through the front wall of the working chamber with a bearing support therein and through the cupped casing part, the said shaft being formed with a passage leading from its inner end to the said reservoir space, whereby liquid leaking from the working chamber through the rear bearing can find egress through said passage to the reservoir and unbalanced axial pressure on the piston is obviated.

20. In a hydraulic shock absorber of the type employing a single swinging piston, the combination of a casing structure having therein a sector-shaped working chamber and comprising a rear wall, a front wall and an intermediate peripheral wall; a swinging piston operatively mounted in the working chamber and forming therewith a pressure chamber at one side of the piston; a shaft for the piston having bearing supports in the front and rear walls of the casing with one end of the shaft projecting through the front wall of the casing; means in the rear wall of the casing affording and controlling egress of liquid from the said pressure chamber; and and a crank arm attached to the said projecting end of the shaft and extending from the same side of the shaft as the swinging piston.

21. In a shock absorber, the combination of a casing structure having a working chamber therein and comprising a rear wall part, a front wall part, an intermediate part forming a peripheral wall of the said chamber, cap screws extending through apertures in the front and intermediate casing parts and having their threaded ends engaging threaded closed-bottom holes in the rear wall part, and a cupped outer casing part covering the front and intermediate casing parts with an intervening reservoir space and connected to the rear wall part with a liquid tight joint; a swinging piston mounted in the working chamber of the casing; a shaft to which the piston is connected extending through the front wall part and the cupped part of the casing with a bearing support in the former; packing means for preventing leakage of liquid from the reservoir through the opening in the cupped casing part through which the shaft passes; and means affording and controlling communication between the said reservoir space and the said chamber in the casing.

22. In a shock absorber, the combination of a casing structure having a working chamber therein and comprising a rear wall part, a front wall part, an intermediate part forming a peripheral wall of the said chamber, cap screws extending through apertures in the front and intermediate casing parts and having their threaded ends engaging threaded closed-bottom holes in the rear wall part, and a cupped outer casing part covering the front and intermediate casing parts with an intervening reservoir space and welded at its rear edge to the rear wall part of the casing with a liquid tight joint; a swinging piston mounted in the working chamber of the casing; a shaft to which the piston is connected extending through the front wall part and the cupped part of the casing with a bearing support in the former; packing means for preventing leakage of liquid from the reservoir through the opening in the cupped casing part through which the shaft passes; and means affording and controlling communication between the said reservoir space and the said chamber in the casing.

23. In a shock absorber, the combination of a casing structure having a working chamber therein and comprising a rear wall part, a front wall part, an intermediate part forming the peripheral wall of the said chamber, cap screws extending through apertures in the front and intermediate wall parts and having their threaded ends engaging threaded closed-bottom holes in the rear wall part, and a cupped outer casing part covering the front and intermediate casing parts with an intervening reservoir space and connected to the rear wall part with a liquid tight joint; a swinging piston mounted in the casing and dividing the said working chamber thereof into two pressure chambers, the said piston having a shaft extending through the front wall part and the cupped part of the casing with a bearing support in the former; conduits affording communication between the said pressure chambers of the piston; means associated with the conduits for controlling the passage of liquid therethrough; packing means for preventing leakage of liquid from the reservoir through the opening in the cupped casing part through which the shaft passes; and means affording communication between the reservoir space and one of the pressure chambers.

24. In a shock absorber, the combination of a casing structure having a working chamber therein and comprising a rear wall part, a front wall part, an intermediate part forming the peripheral wall of the said chamber, cap screws extending through apertures in the front and intermediate wall parts and having their threaded ends engaging threaded closed-bottom holes in the rear wall part, and a cupped outer casing part covering the front and intermediate casing parts with an intervening reservoir space and welded at its rear edge to the rear wall part of the casing with a liquid tight joint; a swinging piston mounted in the casing and dividing the working chamber thereof into two pressure chambers, the said piston having a shaft extending through the front wall part and the cupped part of the casing with a bearing support in the former; conduits affording communication between the said pressure chambers of the piston; means associated with the conduits for controlling the passage of liquid therethrough; packing means for preventing leakage of liquid from the reservoir through the opening in the cupped casing part through which the shaft passes; and means affording communication between the reservoir space and one of the pressure chambers.

25. In a shock absorber, the combination of a casing structure having a working chamber therein and comprising a rear wall part, a front wall part, an intermediate part forming the peripheral wall of the said chamber, means extending from the front wall part to the rear wall part to secure the three said casing parts together, and a cupped outer casing part covering the front and intermediate casing parts with an intervening reservoir space and connected to the rear wall part with a liquid tight joint; a swinging piston mounted in the working chamber of the casing; a shaft to which the piston is connected operatively supported in the casing structure and extending through the front wall part of the casing and through the cupped outer casing part; packing means for preventing leakage of liquid from the reservoir through the opening in the cupped casing part through which the shaft passes; and means affording and controlling communication between the said reservoir space and the said chamber in the casing.

26. In a shock absorber, the combination of a casing structure having a working chamber therein and comprising a rear wall part, a front wall part, an intermediate part forming the peripheral wall of the said chamber, means extending from the front wall part to the rear wall part to secure the three said casing parts together, and a cupped outer casing part covering the front and intermediate casing parts with an intervening reservoir space and welded at its rear edge to the rear wall part with a liquid tight joint; a swinging piston mounted in the working chamber of the casing; a shaft to which the piston is connected extending through the front wall part and the cupped part of the casing with a bearing support in the former; packing means for preventing leakage of liquid from the reservoir through the opening in the cupped casing part through which the shaft passes; and means affording and controlling communication between the said reservoir space and the said chamber in the casing.

27. In a shock absorber, the combination of a casing structure having an inner casing with a working chamber therein for a swinging piston and comprising parallel front and rear wall parts, an intermediate part forming the peripheral wall of said chamber, and means for securing the three said casing parts together, and having an outer casing secured on the inner casing with an intervening reservoir space disposed between the outer casing and the outer face of one of the parallel wall parts of the inner casing and covering the joints between the three parts of the inner casing; a swinging piston mounted in the working chamber of the inner casing; a shaft to which the piston is connected extending through one of the parallel wall parts of the inner casing with a bearing support therein; and means affording and controlling communication between the said reservoir space and the said working chamber of the inner casing.

28. In a shock absorber, the combination of a casing structure having an inner casing with a working chamber therein for a swinging piston and comprising parallel front and rear wall parts, an intermediate part forming the peripheral wall of said chamber, and means for securing the three said casing parts together, and having an outer casing secured on the inner casing with an intervening reservoir space disposed between the outer casing and the outer face of one of the parallel wall parts of the inner casing and covering the joints between the three parts of the inner casing; a swinging piston mounted in the working chamber of the inner casing; a shaft to which the piston is connected extending through the front wall part of the inner casing with a bearing support therein and through the said outer casing; packing means for preventing leakage of liquid from the reservoir through the opening in the outer casing part through which the shaft passes; and means affording and controlling communication between the said reservoir space and the said working chamber of the inner casing.

29. In a shock absorber, the combination of a casing structure having an inner casing with a working chamber therein for a swinging piston and comprising parallel front and rear wall parts, an intermediate part forming the peripheral wall of said chamber, and means for securing the three said casing parts together including a plurality of bolts extending through one of the two parallel wall parts and engaging the other one of said parts, and having an outer casing secured on the inner casing with an intervening reservoir space covering the joints between the three parts of the inner casing and the holes of the said parallel wall part through which the securing bolts extend; a swinging piston mounted in the working chamber of the inner casing; a shaft to which the piston is connected extending through one of the parallel wall parts of the inner casing with a bearing support therein; and means affording and controlling communication between the said reservoir space and the said working chamber of the inner casing.

30. In a shock absorber, the combination of a casing structure having a sector-shaped chamber therein and comprising a rear wall part, a front wall part, an intermediate part forming the peripheral wall of the said chamber, means extending between the front wall and the rear wall part to secure the three said casing parts together, the peripheral outline of the structure formed by the three said parts being substantially circular and eccentric to the axis of the sector-shaped chamber, and a circular outer casing secured on the three-part inner casing structure with its peripheral wall adjacent the peripheral walls of the said inner structure and with an intervening reservoir space between the inner and outer casings covering the joints between the three parts of the inner casing; a swinging piston mounted in the working chamber of the inner casing; a shaft to which the piston is connected extending through one of the inner casing members and the outer casing; packing means for preventing leakage of liquid from the reservoir through the opening in the outer casing part through which the shaft passes; and means affording and controlling communication between the said reservoir space and the said chamber in the casing.

31. In a shock absorber for controlling relative movements of a road-supported vehicle part and a second vehicle part supported by means comprising a suspension spring, the combination of a casing adapted to hold a body of liquid and to be secured to one of said vehicle parts; liquid-forcing means in the casing comprising a chamber and a piston movable in the chamber; piston-actuating means extending to the exterior of the casing and adapted to be connected to the other of said vehicle parts; conduit means for conducting liquid to and from the piston chamber comprising a conduit through which liquid flows during the piston movement corresponding to rebound of the suspension spring; and means for controlling the flow through said conduit comprising a valve device adapted to maintain a moderate resistance to movement of the piston in the rebound direction in the region of its normal position and a separate valve for automatically varying the effective capacity of the said conduit to increase the resistance to the movement of the piston in the rebound direction toward the region of its normal position with increase in the intensity of the force causing relative movement of the two vehicle parts.

32. In a shock absorber for controlling relative movements of a road-supported vehicle part and a second vehicle part supported by means comprising a suspension spring, the combination of a casing adapted to hold a body of liquid and to be secured to one of said vehicle parts; liquid-forcing means in the casing comprising a chamber and a piston movable in the chamber; piston-actuating means extending to the exterior of the casing and adapted to be connected to the other of said vehicle parts; conduit means for conducting liquid to and from the piston chamber comprising a conduit through which liquid flows during the piston movement corresponding to rebound of the suspension spring; and means for controlling the liquid flow through said conduit adapted automatically to compensate approximately for variation in the viscosity of the liquid and maintain a moderate resistance to the movement of the piston in the region of its normal position in the rebound direction that is substantially constant for a given piston speed and to vary the effective capacity of the said conduit automatically to increase the resistance to the piston movement in the rebound direction toward the region of its normal position with increase in the intensity of the force causing relative movement of the two vehicle parts.

33. In a shock absorber for controlling relative movements of a road-supported vehicle part and a second vehicle part supported by means comprising a suspension spring, the combination of a casing adapted to hold a body of liquid and to be secured to one of said vehicle parts; liquid-forcing means in the casing comprising a chamber and a piston movable in the chamber; piston-actuating means extending to the exterior of the casing and adapted to be connected to the other of said vehicle parts; conduit means for conducting liquid to and from the piston chamber comprising a conduit through which liquid flows during the piston movement corresponding to rebound of the suspension spring; and means for controlling the liquid flow through the said conduit comprising a valve operating during movement of the piston in a zone outside of the region of the normal position of the piston to increase the resistance to the movement of the piston in the rebound direction toward said region of normal position with increase in the intensity of the force causing relative movement of the two vehicle parts and a separate valve device adapted approximately to compensate for variation in the viscosity of the liquid and maintain a moderate resistance to movement of the piston in rebound direction in the region of its normal position that is substantially constant for a given piston speed.

34. In a shock absorber for controlling relative movements of a road-supported vehicle part and a second vehicle part supported by means comprising a suspension spring, the combination of a casing adapted to hold a body of liquid and to be secured to one of said vehicle parts; liquid-forcing means in the casing comprising a chamber and a piston movable in the chamber; piston-actuating means extending to the exterior of the casing and adapted to be connected to the other of said vehicle parts; conduit means for conducting liquid to and from the piston chamber comprising a conduit through which liquid flows during the piston movement corresponding to rebound of the suspension spring; and means for controlling the liquid flow through the said conduit operating during movement of the piston in a zone outside of the region of the normal position of the piston to increase the resistance to the movement of the piston in the rebound direction toward said region of normal position with increase in the intensity of the force causing relative movement of the two vehicle parts and acting to maintain a moderate resistance to movement of the piston in rebound direction in the region of its normal position that is substantially constant for a given piston speed notwithstanding variation in the viscosity of the liquid.

35. In a shock absorber for controlling relative movements of a road-supported vehicle part and a second vehicle part supported by means comprising a suspension spring, the combination of a casing having two pressure chambers therein for a working liquid and adapted to be secured to one of said vehicle parts; piston means operatively mounted for movement in said pressure chambers; piston-actuating means extending from the interior to the exterior of the casing and adapted to be connected to the other of said vehicle parts; conduit means forming passageways for the flow of liquid into and out of each pressure chamber; and means adapted to control the flow of liquid out of the two pressure chambers and offer to the movement of the piston during the latter part of its full spring-compression movement and the fore part of its corresponding spring-rebound movement a resistance automatically variable with variation in the intensity of the force causing corresponding relative movement of the two vehicle parts and also offer to the movement of the piston in the rebound direction in the region of its normal position a moderate resistance that is substantially constant for a given piston speed notwithstanding variations in the viscosity of the working liquid.

36. In a shock absorber for controlling relative movements of a road-supported vehicle part and a second vehicle part supported by means comprising a suspension spring, the combination of a casing having two pressure chambers therein for a working liquid and adapted to be secured to one of said vehicle parts; piston means operatively mounted for movement in said pressure chambers; piston-actuating means extending from the interior to the exterior of the casing and adapted to be connected to the other of said vehicle parts; conduit means forming passageways for the flow of liquid into and out of each pressure chamber; means adapted to control the flow of liquid out of the two pressure chambers comprising a valve device adapted to offer to the piston means during the latter part of the full spring-compression movement thereof and during the fore part of the corresponding spring-rebound movement thereof a resistance variable with variation in the intensity of the force causing the corresponding relative movement of the two vehicle parts and a separate spring-pressed valve adapted to offer to the movement of the piston in the rebound direction in the region of its normal position a moderate resistance that is substantially constant for a given piston speed notwithstanding variations in the viscosity of the liquid.

37. In a hydraulic shock absorber, the combination of a piston comprising a cylindrical hub and a vane extending therefrom; and a casing structure in which the piston is mounted comprising a part having a flat surface disposed transversely to the axis of the piston hub to engage one side of the piston vane, a second part having a flat surface correspondingly disposed to engage the other side of the piston vane, a third part disposed between said first and second parts and having flat lateral surfaces engaging the said flat surfaces of the two other casing parts and also having a curved surface arranged to engage the cylindrical surface of the piston hub and another curved surface arranged to engage the outer peripheral surface of the said vane, means for securing the three said casing parts together in fixed relation, and means forming a liquid reservoir space disposed to receive liquid leaking outward through the joints between the flat surfaces of the three said casing parts.

GORDON R. PENNINGTON.

Certificate of Correction

July 30, 1935.

Patent No. 2,009,677.

GORDON R. PENNINGTON

It is hereby certified that errors appear in the printed specification of the above numbered patent requiring correction as follows: Page 1, first column, line 11, for "17,049" read *17,409*; page 2, second column, line 45, after "11ª" insert a *comma*; page 5, second column, line 53, for "curve *b*" read *curves b and c*; page 8, first column, line 67, for "means" read *mean*; page 11, second column, line 73, for "so" read *to*; and page 17, first column, line 11, claim 20, strike out the word *and*; and that the said Letters Patent should be read with these corrections therein that the same may conform to the record of the case in the Patent Office.

Signed and sealed this 8th day of October, A. D. 1935.

[SEAL]

LESLIE FRAZER,
*Acting Commissioner of Patents.*

Disclaimer 2,009,677.—*Gordon R. Pennington*, Cleveland Heights, Ohio. SHOCK ABSORBER FOR MOTOR VEHICLES. Patent dated July 30, 1935. Disclaimer filed Jan. 26, 1948, by the assignee, *Pennington Engineering Company*.

Hereby enters this disclaimer to claim 37, and related claims 1, 2, 3, 4, 5, 21, 22, 23, 24, 25, 26, 27, 28, and 29 of said patent.

[*Official Gazette February 24, 1948.*]